United States Patent
Taguchi et al.

(10) Patent No.: US 9,224,299 B2
(45) Date of Patent: Dec. 29, 2015

(54) CRUISE CONTROL PLAN EVALUATION DEVICE AND METHOD

(75) Inventors: Koji Taguchi, Isehara (JP); Tomoyuki Doi, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 568 days.

(21) Appl. No.: 12/312,001

(22) PCT Filed: Nov. 1, 2007

(86) PCT No.: PCT/IB2007/004348
§ 371 (c)(1),
(2), (4) Date: Apr. 22, 2009

(87) PCT Pub. No.: WO2008/053373
PCT Pub. Date: May 8, 2008

(65) Prior Publication Data
US 2010/0010699 A1    Jan. 14, 2010

(30) Foreign Application Priority Data
Nov. 1, 2006    (JP) .................................. 2006-298227

(51) Int. Cl.
G08G 1/16    (2006.01)
B60W 30/08    (2012.01)
(Continued)

(52) U.S. Cl.
CPC .............. G08G 1/163 (2013.01); B60W 30/08 (2013.01); B60W 30/0956 (2013.01); G08G 1/167 (2013.01); B62D 6/00 (2013.01)

(58) Field of Classification Search
USPC .............. 701/1, 23, 28, 91, 93, 96, 300–302; 340/901, 903, 435, 436; 180/170, 271
See application file for complete search history.

(56) References Cited

U.S. PATENT DOCUMENTS 4,986,384 A    1/1991    Okamoto et al.
5,343,206 A    8/1994    Ansaldi et al.
(Continued)

FOREIGN PATENT DOCUMENTS

DE    102 31 557 A1    7/2003
DE    10 2007 042 792 A1    3/2009
(Continued)

OTHER PUBLICATIONS

Sep. 15, 2009 Search Report issued in International Application No. PCT/JP2009/060063 (with translation).
(Continued)

Primary Examiner — Helal A Algahaim
Assistant Examiner — Donald J Wallace
(74) Attorney, Agent, or Firm — Oliff PLC

(57) ABSTRACT

A cruise control plan evaluation device (10) that evaluates safety of a cruise control plan for an automatically-operated vehicle includes: a behavior prediction unit (16a) that predicts a behavior that may be exhibited by a nearby vehicle, which is present near the automatically-operated vehicle, at a given time point; a position prediction unit (16b) that predicts a position of the nearby vehicle after the given time point based on a position of the nearby vehicle at the given time point and the behavior predicted by the behavior prediction unit (16a); and an evaluation unit (20) that evaluates the safety of the cruise control plan based on the position of the nearby vehicle predicted by the position prediction unit (16b) and a position that is reached by the automatically-operated vehicle according to the cruise control plan.

16 Claims, 14 Drawing Sheets

(51) Int. Cl.
  *B60W 30/095* (2012.01)
  *B62D 6/00* (2006.01)

(56) References Cited

U.S. PATENT DOCUMENTS

| | | | |
|---|---|---|---|
| 5,479,173 A | 12/1995 | Yoshioka et al. | |
| 5,529,138 A | 6/1996 | Shaw et al. | |
| 5,689,264 A | 11/1997 | Ishikawa et al. | |
| 5,761,630 A | 6/1998 | Sekine et al. | |
| 5,818,355 A | 10/1998 | Shirai et al. | |
| 5,926,117 A * | 7/1999 | Gunji et al. | 340/988 |
| 5,949,366 A | 9/1999 | Herrmann | |
| 5,964,822 A | 10/1999 | Alland et al. | |
| 6,014,601 A | 1/2000 | Gustafson | |
| 6,026,347 A | 2/2000 | Schuster | |
| 6,122,572 A * | 9/2000 | Yavnai | 701/23 |
| 6,185,499 B1 * | 2/2001 | Kinoshita et al. | 701/96 |
| 6,195,157 B1 * | 2/2001 | Yamashita et al. | 356/4.01 |
| 6,202,027 B1 | 3/2001 | Alland et al. | |
| 6,223,117 B1 * | 4/2001 | Labuhn et al. | 701/93 |
| 6,265,991 B1 | 7/2001 | Nishiwaki et al. | |
| 6,269,307 B1 | 7/2001 | Shinmura et al. | |
| 6,338,022 B1 | 1/2002 | Shinmura et al. | |
| 6,502,034 B1 * | 12/2002 | Miller | 701/301 |
| 6,571,176 B1 | 5/2003 | Shinmura et al. | |
| 6,574,535 B1 | 6/2003 | Morris et al. | |
| 6,611,227 B1 | 8/2003 | Nebiyeloul-Kifle et al. | |
| 6,721,659 B2 | 4/2004 | Stopczynski | |
| 6,784,828 B2 | 8/2004 | Delcheccolo et al. | |
| 6,807,482 B2 | 10/2004 | Utsumi | |
| 6,810,132 B1 | 10/2004 | Umezaki et al. | |
| 6,856,906 B2 * | 2/2005 | Winner et al. | 701/301 |
| 6,859,731 B2 | 2/2005 | Takafuji et al. | |
| 6,873,911 B2 | 3/2005 | Nishira et al. | |
| 6,889,140 B2 * | 5/2005 | Isogai et al. | 701/301 |
| RE38,870 E | 11/2005 | Hall | |
| 7,030,775 B2 | 4/2006 | Sekiguchi | |
| 7,069,146 B2 * | 6/2006 | Yamamura et al. | 701/301 |
| 7,071,868 B2 | 7/2006 | Woodington et al. | |
| 7,085,637 B2 | 8/2006 | Breed et al. | |
| 7,212,905 B2 | 5/2007 | Grill | |
| 7,382,274 B1 | 6/2008 | Kermani et al. | |
| 7,447,593 B2 | 11/2008 | Estkowski et al. | |
| 7,610,121 B2 | 10/2009 | Nishira et al. | |
| 7,626,533 B2 | 12/2009 | Cong et al. | |
| 7,830,242 B2 | 11/2010 | Meister et al. | |
| 7,840,330 B2 | 11/2010 | Heinrichs-Bartscher | |
| 7,904,246 B2 | 3/2011 | Kondoh et al. | |
| 7,961,084 B2 * | 6/2011 | Aso et al. | 340/436 |
| 7,974,784 B2 | 7/2011 | Moriizumi et al. | |
| 8,055,445 B2 | 11/2011 | Schiffmann et al. | |
| 8,090,537 B2 | 1/2012 | Nishira et al. | |
| 8,170,739 B2 | 5/2012 | Lee | |
| 8,244,408 B2 | 8/2012 | Lee et al. | |
| 8,290,637 B2 | 10/2012 | Krupadanam et al. | |
| 8,305,254 B2 | 11/2012 | Nanami | |
| 2001/0039472 A1 | 11/2001 | Isogai et al. | |
| 2002/0022927 A1 | 2/2002 | Lemelson et al. | |
| 2002/0049539 A1 | 4/2002 | Russell et al. | |
| 2002/0107637 A1 | 8/2002 | Okamura et al. | |
| 2003/0065432 A1 | 4/2003 | Shuman et al. | |
| 2003/0187578 A1 | 10/2003 | Nishira et al. | |
| 2004/0030499 A1 | 2/2004 | Knoop et al. | |
| 2004/0090117 A1 | 5/2004 | Dudeck et al. | |
| 2004/0193347 A1 * | 9/2004 | Harumoto et al. | 701/45 |
| 2004/0239509 A1 | 12/2004 | Kisacanin et al. | |
| 2005/0004723 A1 * | 1/2005 | Duggan et al. | 701/24 |
| 2005/0063565 A1 | 3/2005 | Nagaoka et al. | |
| 2005/0197770 A1 * | 9/2005 | Schiffmann et al. | 701/301 |
| 2005/0256630 A1 | 11/2005 | Nishira et al. | |
| 2005/0288844 A1 * | 12/2005 | Kimura et al. | 701/100 |
| 2006/0095193 A1 | 5/2006 | Nishira et al. | |
| 2006/0149462 A1 | 7/2006 | Sawamoto et al. | |
| 2006/0190175 A1 | 8/2006 | Moriizumi et al. | |
| 2007/0043502 A1 | 2/2007 | Mudalige et al. | |
| 2007/0054685 A1 | 3/2007 | Kellum | |
| 2007/0106431 A1 | 5/2007 | Tsuzuki et al. | |
| 2007/0203634 A1 | 8/2007 | Dort | |
| 2007/0219695 A1 | 9/2007 | Chiu et al. | |
| 2007/0276600 A1 | 11/2007 | King et al. | |
| 2008/0065328 A1 | 3/2008 | Eidehall et al. | |
| 2008/0097699 A1 | 4/2008 | Ono | |
| 2008/0167821 A1 | 7/2008 | Breed | |
| 2008/0189040 A1 * | 8/2008 | Nasu et al. | 701/301 |
| 2008/0243389 A1 * | 10/2008 | Inoue et al. | 701/301 |
| 2008/0303696 A1 | 12/2008 | Aso et al. | |
| 2009/0024357 A1 | 1/2009 | Aso et al. | |
| 2009/0037052 A1 | 2/2009 | Ogasawara et al. | |
| 2009/0187290 A1 | 7/2009 | Moriizumi et al. | |
| 2009/0192666 A1 * | 7/2009 | Trippler | 701/29 |
| 2009/0248284 A1 | 10/2009 | Yoshioka et al. | |
| 2009/0271050 A1 | 10/2009 | Niki et al. | |
| 2009/0292468 A1 | 11/2009 | Wu et al. | |
| 2009/0319113 A1 | 12/2009 | Lee | |
| 2010/0045482 A1 | 2/2010 | Strauss | |
| 2010/0094509 A1 | 4/2010 | Luke et al. | |
| 2010/0100324 A1 | 4/2010 | Caminiti et al. | |
| 2010/0106418 A1 | 4/2010 | Kindo et al. | |
| 2010/0121576 A1 | 5/2010 | Aso et al. | |
| 2010/0324775 A1 | 12/2010 | Kermani et al. | |
| 2011/0298603 A1 | 12/2011 | King et al. | |
| 2011/0313664 A1 * | 12/2011 | Sakai et al. | 701/301 |
| 2012/0022716 A1 | 1/2012 | Kitahama et al. | |
| 2012/0035846 A1 | 2/2012 | Sakamoto et al. | |
| 2012/0059789 A1 | 3/2012 | Sakai et al. | |
| 2012/0065841 A1 | 3/2012 | Nagata et al. | |
| 2012/0218093 A1 | 8/2012 | Yoshizawa et al. | |

FOREIGN PATENT DOCUMENTS

| | | | |
|---|---|---|---|
| EP | 0 884 666 A1 | 12/1998 | |
| EP | 1 332 910 A1 | 8/2003 | |
| EP | 1 598 233 A2 | 11/2005 | |
| EP | 1 612 083 A2 | 1/2006 | |
| JP | A-4-54600 | 2/1992 | |
| JP | 5-266399 | 10/1993 | |
| JP | A-10-105885 | 4/1998 | |
| JP | A-10-105895 | 4/1998 | |
| JP | A-11-126294 | 5/1999 | |
| JP | A-11-144185 | 5/1999 | |
| JP | 2969174 B1 | 11/1999 | |
| JP | A-11-345396 | 12/1999 | |
| JP | A-2000-057476 | 2/2000 | |
| JP | 2000137900 A * | 5/2000 | B60K 31/00 |
| JP | A-2000-207691 | 7/2000 | |
| JP | A-2000-242898 | 9/2000 | |
| JP | A-2000-264210 | 9/2000 | |
| JP | A-2001-301484 | 10/2001 | |
| JP | A-2002-307972 | 10/2002 | |
| JP | A-2003-63430 | 3/2003 | |
| JP | A-2003-081037 | 3/2003 | |
| JP | A-2003-228800 | 8/2003 | |
| JP | 3501009 B2 | 2/2004 | |
| JP | A-2004-106588 | 4/2004 | |
| JP | A-2004-170283 | 6/2004 | |
| JP | A-2004-182149 | 7/2004 | |
| JP | A-2005-82124 | 3/2005 | |
| JP | A-2005-135018 | 5/2005 | |
| JP | A-2005-250756 | 9/2005 | |
| JP | 3714258 B2 | 11/2005 | |
| JP | A-2006-123795 | 5/2006 | |
| JP | A-2006-154967 | 6/2006 | |
| JP | A-2006-178673 | 7/2006 | |
| JP | A-2007-151107 | 6/2007 | |
| JP | A-2007-257519 | 10/2007 | |
| JP | A-2008-117082 | 5/2008 | |
| JP | A-2008-191781 | 8/2008 | |
| JP | A-2008-195289 | 8/2008 | |
| JP | A-2008-296641 | 12/2008 | |
| WO | WO 2006/070865 A1 | 7/2006 | |
| WO | WO 2008/053373 A2 | 5/2008 | |

(56) References Cited

OTHER PUBLICATIONS

Sep. 15, 2009 Written Opinion issued in International Application No. PCT/JP2009/060063 (with translation).
Office Action issued in Chinese Patent Application No. CN 200780041615.7 on Nov. 18, 2010 (with translation).
Oct. 6, 2011 Office Action issued in U.S. Appl. No. 12/312,224.
Mar. 9, 2012 Office Action issued in U.S. Appl. No. 12/312,224.
U.S. Appl. No. 12/312,224 filed Apr. 30, 2009 in the name of Koji Taguchi et al.
Dec. 7, 2012 Office Action issued in German Patent Application No. 11 2009 004 844.7 (translation only).
Jun. 25, 2013 Notice of Allowance issued in U.S. Appl. No. 13/375,509.
Jul. 5, 2013 Office Action issued in U.S. Appl. No. 12/515,391.
Oct. 1, 2012 Office Action issued in U.S. Appl. No. 12/312,224.
Feb. 11, 2013 Office Action issued in U.S. Appl. No. 13/375,509.
Feb. 10, 2014 Office Action issued in U.S. Appl. No. 12/515,391.
Jun. 16, 2014 Office Action issued in U.S. Appl. No. 12/515,391.
May 8, 2015 Notice of Allowance issued in U.S. Appl. No. 12/515,391.
Oct. 8, 2014 Office Action issued in U.S. Appl. No. 12/515,391.

\* cited by examiner

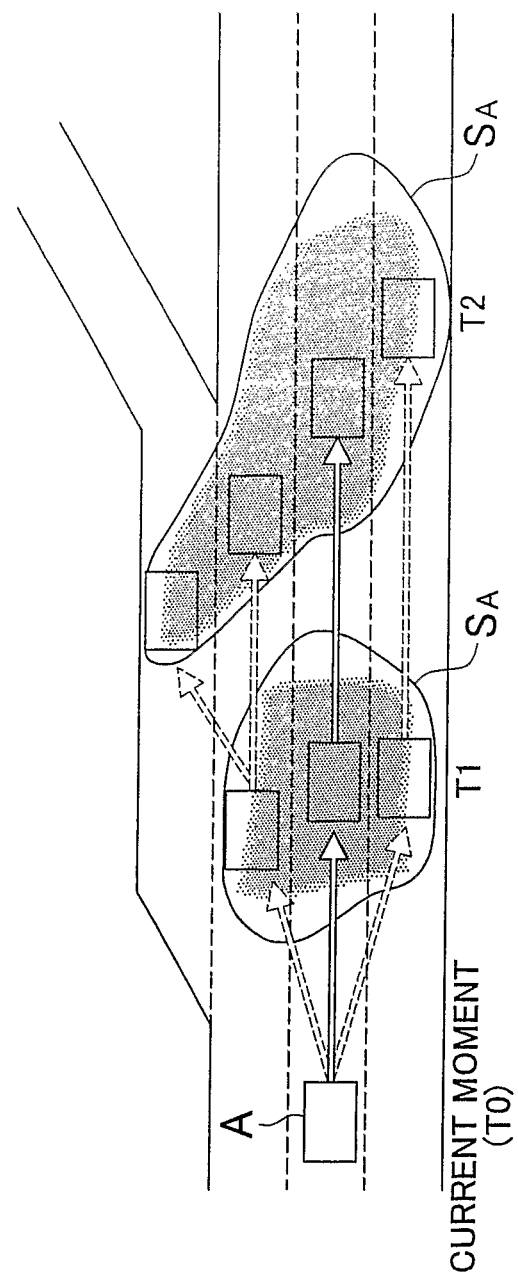

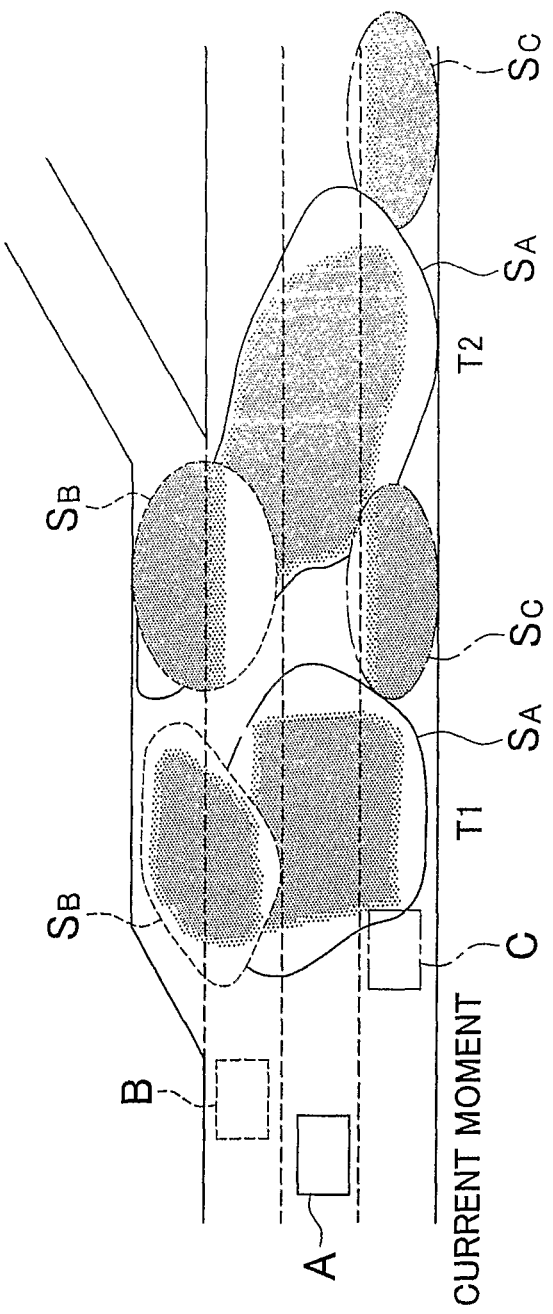

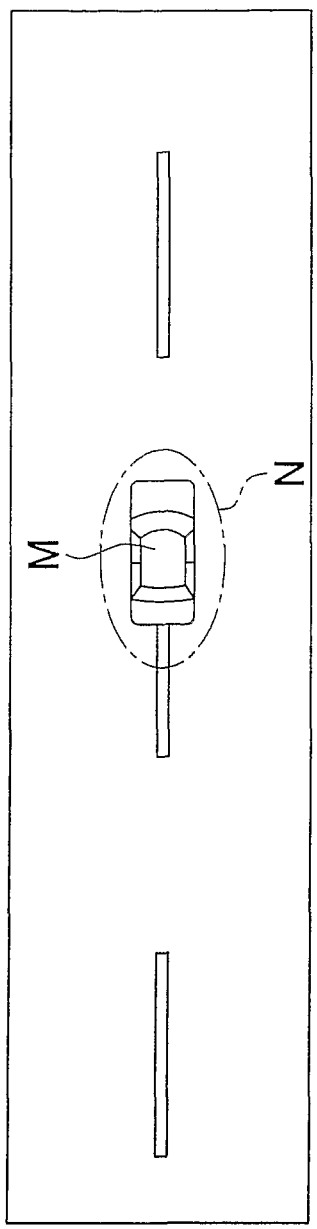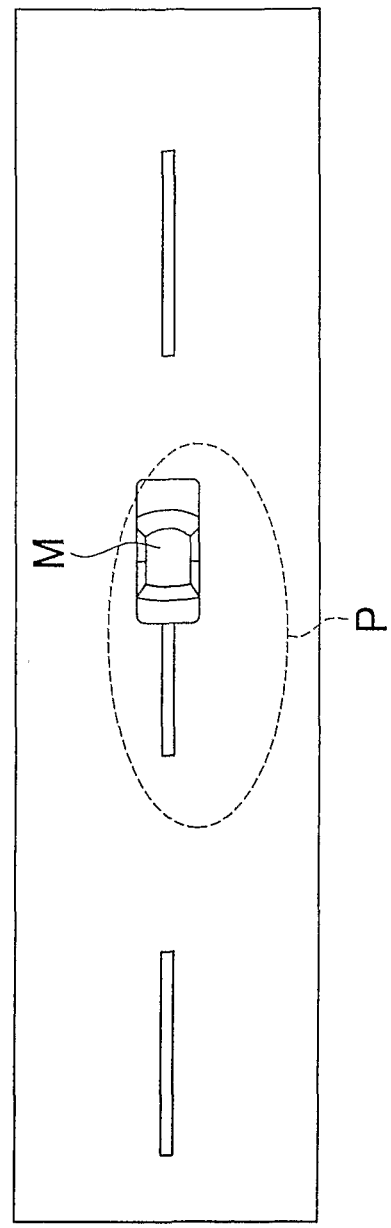
FIG. 4A
FIG. 4B

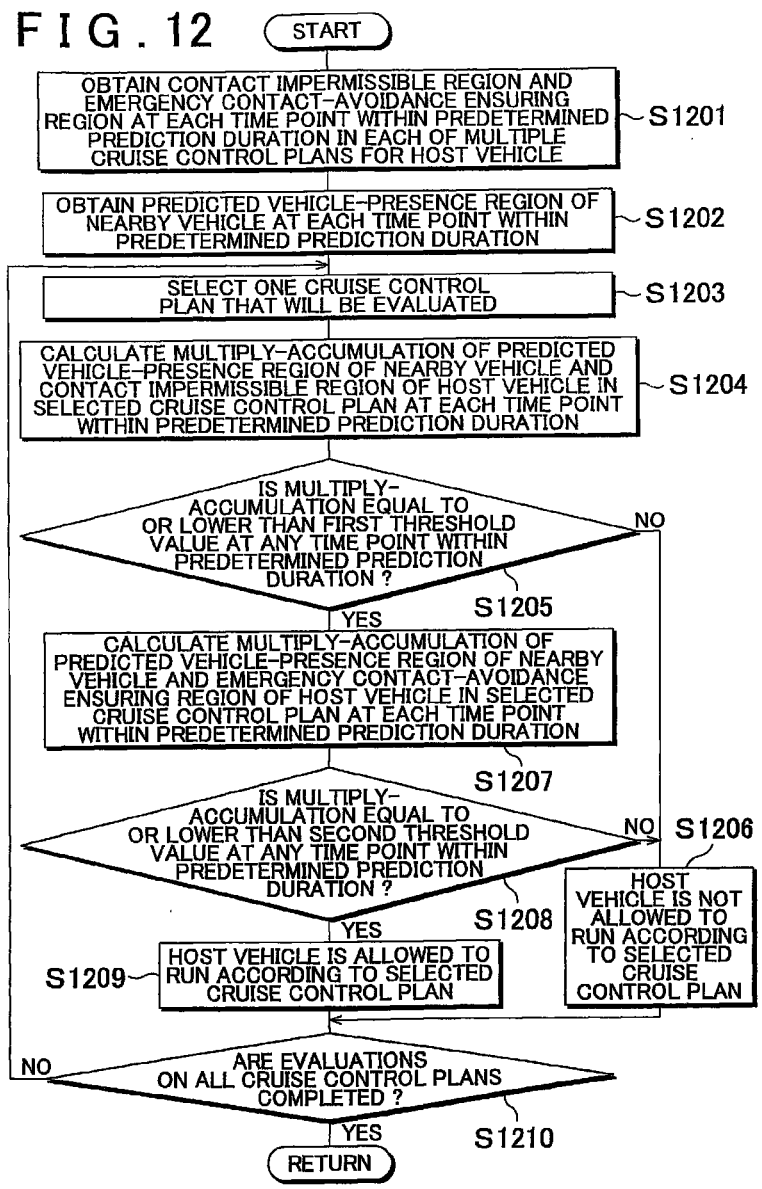

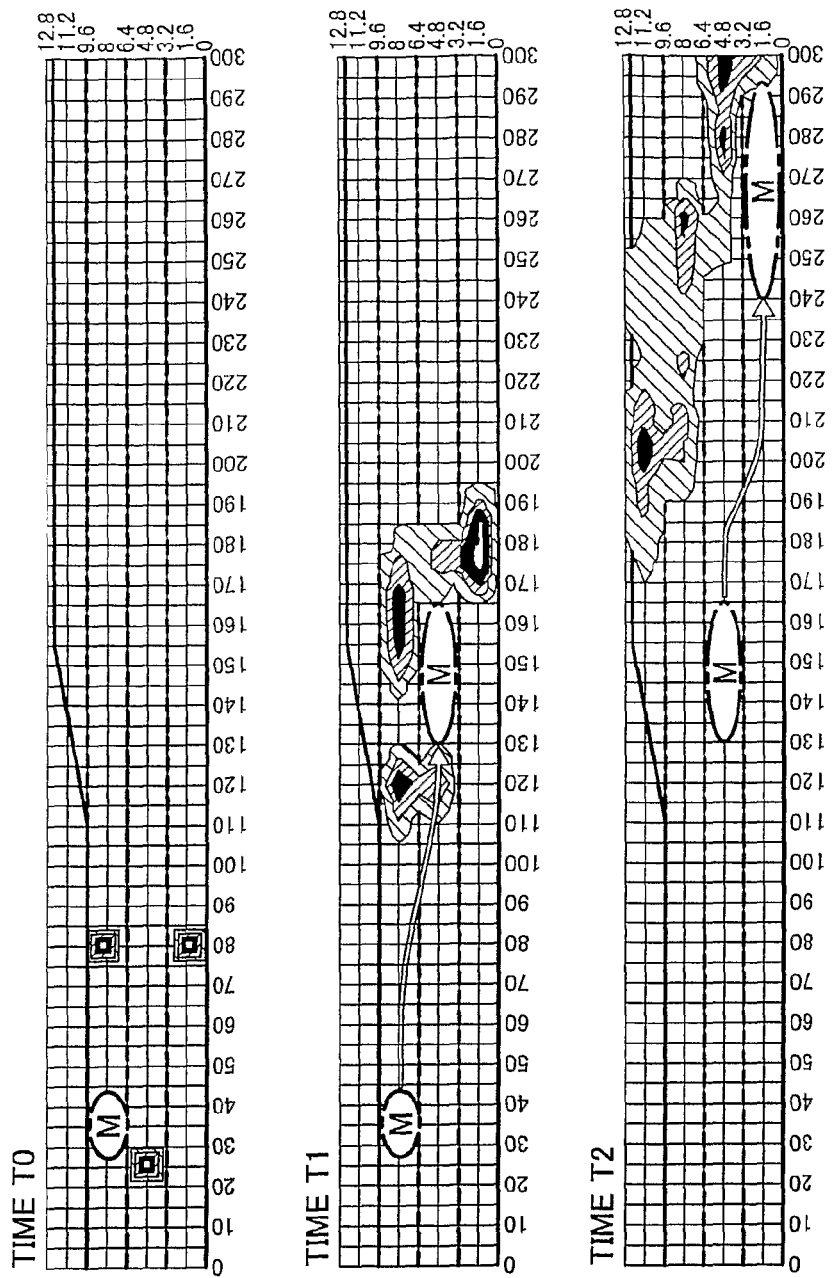

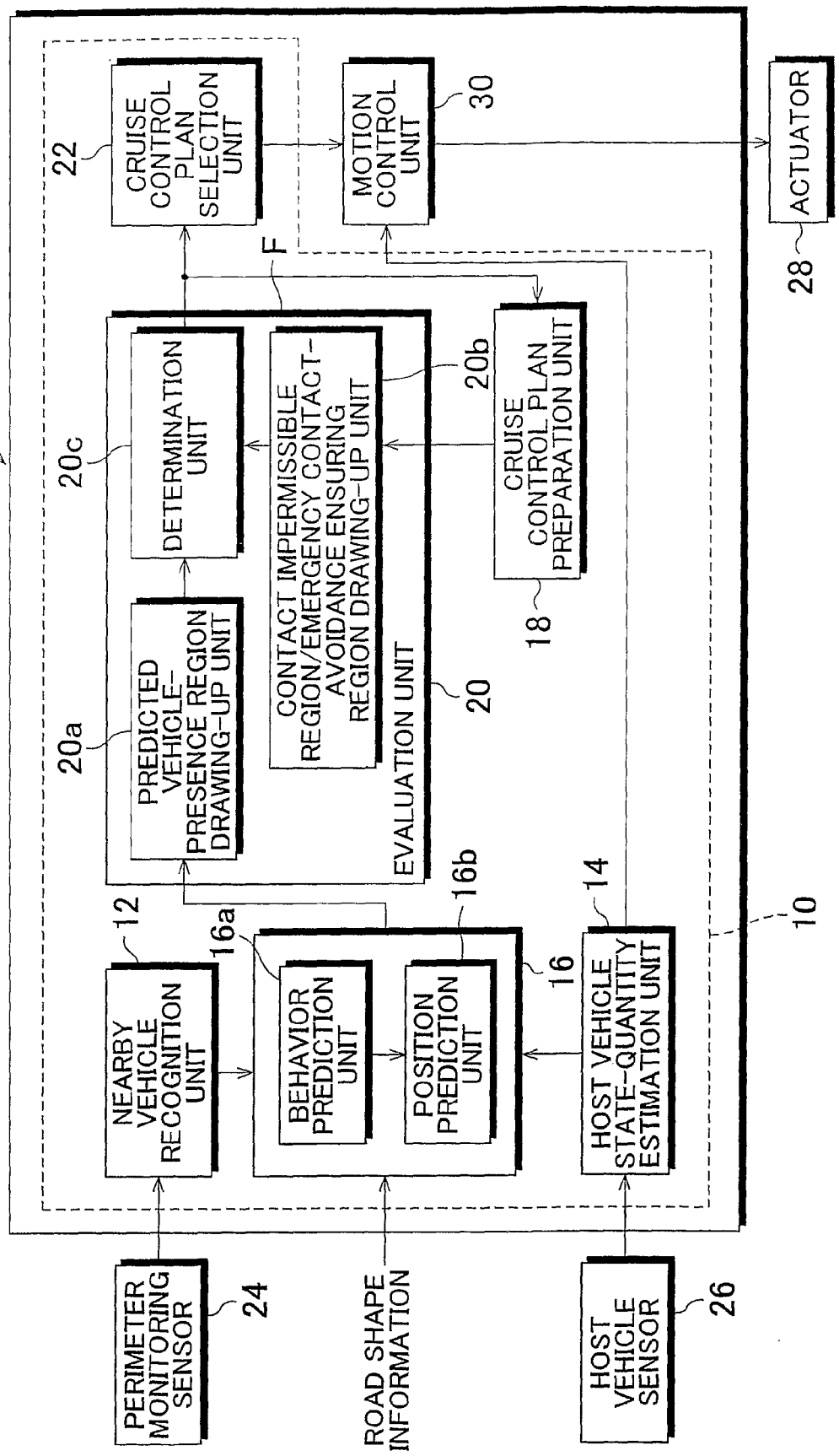

CRUISE CONTROL PLAN EVALUATION DEVICE AND METHOD

BACKGROUND OP THE INVENTION

1. Field of the Invention

The invention relates to an evaluation device and method that evaluates cruise control plans for an automatically-operated vehicle.

2. Description of the Related Art

A device that controls an automatic operation of a vehicle is described in, for example, Japanese Patent No. 3714258. The device predicts future behaviors that may be exhibited by a vehicle group including a vehicle near the host vehicle under the influence of the behavior of the host vehicle. The device then evaluates the validity of the future operation of the host vehicle, and indicates the desirable amount by which the host vehicle is operated from the current moment, to the future.

However, if a vehicle near the host vehicle is a manually-operated vehicle, it is difficult to predict the behaviors of this nearby vehicle because it constantly changes. Therefore, it is difficult to evaluate the safety of the cruise control plans for the host vehicle.

SUMMARY OF THE INVENTION

The invention provides a cruise control plan evaluation device and method that makes it possible to more accurately evaluate the safety of cruise control plans for an automatically-operated vehicle.

A first aspect of the invention relates to a cruise control plan evaluation device that evaluates safety of a cruise control plan for an automatically-operated vehicle. The cruise control plan evaluation device includes: a behavior prediction unit that predicts a behavior that may be exhibited by a nearby vehicle, which is present near the automatically-operated vehicle, at a given time point; a position prediction unit that predicts a position of the nearby vehicle after the given time point based on a position of the nearby vehicle at the given time point and the behavior predicted by the behavior prediction unit; and an evaluation unit that evaluates the safety of the cruise control plan based on the position of the nearby vehicle predicted by the position prediction unit and a position that is reached by the automatically-operated vehicle according to the cruise control plan.

The cruise control plan evaluation device according to the first aspect of the invention constantly predicts a behavior that may be exhibited by the nearby vehicle, predicts a future position of the nearby vehicle, and evaluates the safety of the cruise control plan. Accordingly, it is possible to accurately evaluate the safety of the cruise control plan for the automatically-operated vehicle.

The behavior prediction unit may predict the behavior of the nearby vehicle based on at least information concerning a road shape. In this way, it is possible to accurately predict the behavior that may be exhibited by the nearby vehicle based on the information, for example, whether the number of lanes decreases or whether there is a curve in the road ahead.

The cruise control plan evaluation device according to the first aspect of the invention may further include: a cruise control plan preparation unit that prepares multiple cruise control plans for the automatically-operated vehicle; and a cruise control plan selection unit that selects the cruise control plan to be implemented from among the multiple cruise control plans based on the results of evaluations made by the evaluation unit. With this configuration, it is possible to select and implement the cruise control plan having a higher level of safety.

The cruise control plan evaluation device according to me first aspect of the invention may farther include a cruise control plan preparation unit that prepares a cruise control plan for the automatically-operated vehicle. The cruise control plan preparation unit may modify the cruise control plan based on the result of evaluation made by the evaluation unit. With this configuration, it is possible to prepare a safer cruise control plan through modification.

The behavior prediction unit may predict the behavior that may be exhibited by the nearby vehicle and estimate the probability that the nearby vehicle exhibits the behavior. In this way, it is possible to predict the future position of the nearby vehicle along with the probability that the nearby vehicle will be at this future position.

The evaluation unit may include: a predicted vehicle-presence region drawing-up unit that draws up a predicted vehicle-presence region that indicates a region, in which the nearby vehicle is predicted to be present, using a probability distribution based on the position of the nearby vehicle predicted by the position prediction unit and the probability estimated by the behavior prediction unit; a contact impermissible region drawing-up unit that draws up a contact impermissible region that indicates a region, which needs to be maintained to prevent contact between the automatically-operated vehicle and me nearby vehicle, using a probability distribution in a manner such that an outline of the contact impermissible region surrounds the automatically-operated vehicle; and a determination unit that determines that the cruise control plan is safe when the result of multiply-and-accumulation of the predicted vehicle-presence region and the contact impermissible region is equal to or lower than a first threshold value at any time point. With this configuration, it is possible to accurately evaluate the safety of the cruise control plan for the automatically-operated vehicle by determining whether the result of multiply-and-accumulation of the predicted vehicle-presence region and the contact impermissible region is equal to or lower than the first threshold value at any time point.

The evaluation unit may include an emergency contact-avoidance ensuring region drawing-up unit that draws up an emergency contact-avoidance ensuring region that indicates a region, which needs to be maintained to prevent contact between the automatically-operated vehicle and the nearby vehicle in an emergency, using a probability distribution in a manner such that an outline of the emergency contact-avoidance ensuring region surrounds the automatically-operated vehicle. The determination unit may determine that the cruise control plan is safe when the result of multiply-and-accumulation of the predicted vehicle-presence region and the emergency contact-avoidance ensuring region is equal to or lower than a second threshold value at any time point. In this way, it is possible to more accurately evaluate the safety of the cruise control plan, because the measures to prevent contact between the automatically-operated vehicle and the nearby vehicle in the event of an emergency is also taken into account.

A second aspect of the invention relates to a cruise control plan evaluation method for evaluating safety of a cruise control plan for an automatically-operated vehicle. The cruise control plan evaluation method includes: predicting a behavior that may be exhibited by a nearby vehicle, which is present near the automatically-operated vehicle, at a given time point; predicting a position of the nearby vehicle after the given time point based on a position of the nearby vehicle at the given time point and the predicted behavior; and evaluating the safety of the cruise control plan based on the predicted position of the nearby vehicle and a position that is reached by the automatically-operated vehicle according to the cruise control plan.

According to the aspects of the invention described above, it is possible to provide the cruise control plan evaluation device and method that makes it possible to accurately evaluate the safety cruise control plans for the automatically-operated vehicle.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 2 is a view illustrating the manner for predicting the behaviors and the future positions of a nearby vehicle;

FIG. 3 is a view illustrating the manner for predicting the behaviors and the future positions of multiple nearby vehicles;

FIG. 4A is a view illustrating the contact impermissible region;

FIG. 4B is a view illustrating the emergency contact-avoidance ensuring region;

FIG. 12 is a flowchart showing the routine executed by a determination unit;

FIGS. 13A to 13C are views illustrating an example of a cruise control plan that is determined to be safe according to the evaluation made by an evaluation unit; and FIG. 14 is a block diagram showing the configuration of the automatic operation control apparatus including a cruise control plan evaluation device according to a modified example of the embodiment of the invention.

DETAILED DESCRIPTION OF THE EMBODIMENT

Figure 1:
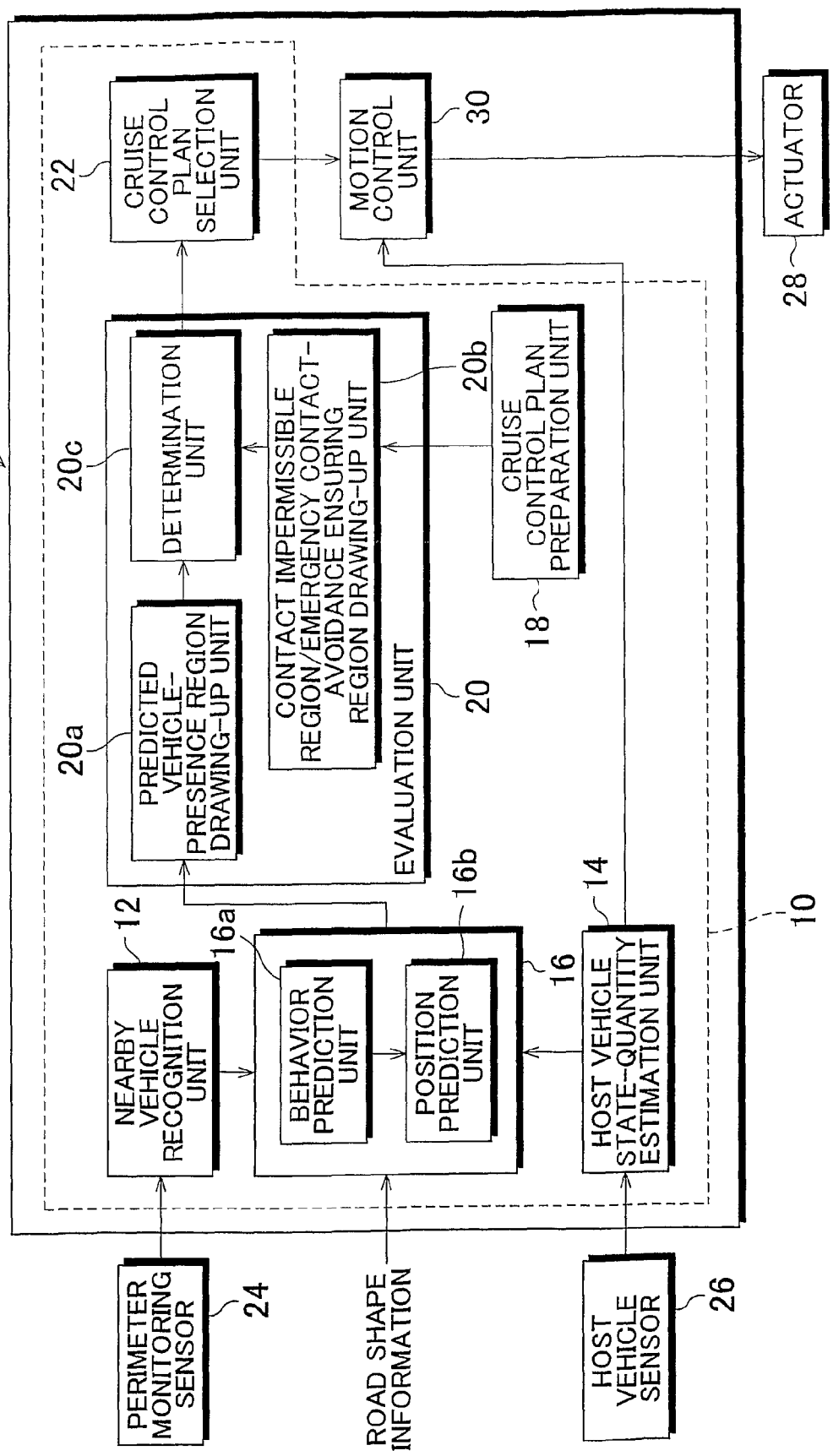
FIG. 1 is a block diagram showing the configuration of an automatic operation control apparatus including a cruise control plan evaluation device according to an embodiment of the invention.

Hereafter, an embodiment of the invention will be described with reference to the accompanying drawings. The same reference numerals will be assigned to the same components, and the description concerning the components having the same reference numerals will be provided only once below.

An automatic operation control apparatus 1 including a cruise control plan evaluation device (hereinafter, referred to as an "evaluation device") 10 according to the embodiment of the invention is formed of hardware of a microcomputer, for example, an ECU (Electronic Control Unit) and software, and is mounted in an automatically-operated vehicle. The automatic operation control apparatus 1 includes the evaluation device 10 and a motion control unit 30. The evaluation device 10 includes a nearby vehicle recognition unit 12, a host vehicle state-quantity estimation unit 14, an estimation/prediction calculating unit 16, a cruise control plan preparation unit 18, an evaluation unit 20, and a cruise control plan selection unit 22.

The nearby vehicle recognition unit 12 is connected to a perimeter monitoring sensor 24, for example, a millimeter-wave radar, an image sensor, a laser radar, and an ultrasonic-wave sensor. The nearby vehicle recognition unit 12 recognizes a nearby vehicle which is present near the automatically-operated vehicle (i.e., host vehicle) based on values detected by the perimeter monitoring sensor 24 (for example, information indicated by waves reflected from objects such as the nearby vehicle), and calculates the information concerning the nearby vehicle, for example, the relative distance, angle and speed between the host vehicle and the nearby vehicle.

The host vehicle state-quantity estimation unit 14 is connected to a host vehicle sensor 26 that detects the state quantity of the host vehicle. The host vehicle sensor 26 is, for example, a yaw-rate sensor, a vehicle speed sensor, an acceleration sensor, a steering angle sensor, a white line detection sensor, and a GPS. The host vehicle state-quantity estimation unit 14 calculates an estimate value of the state quantity of the host vehicle (yaw-rate of the host vehicle, lateral position of the host vehicle within a lane, lateral velocity of the host vehicle, yaw angle of the host vehicle with respect to the road line shape, position of the host vehicle, etc.) based on the values detected by the host vehicle sensor 26.

The estimation/prediction calculating unit 16 includes a behavior prediction unit 16a, and a position prediction unit 16b. The behavior prediction unit 16a obtains the information concerning the nearby vehicle calculated by the nearby vehicle recognition unit 12, and the estimate value of the state quantity of the host vehicle calculated by the host vehicle state-quantity estimation unit 14. Then, the behavior prediction unit 16a calculates the history information concerning the position of the host vehicle, the history information concerning the relative position between the host vehicle and the nearby vehicle, the relative speed between the host vehicle and the nearby vehicle, etc. based on the obtained information, and estimates the history information concerning the position of the nearby vehicle, and the current state (speedy acceleration, yaw-angle with respect to the road line shape, etc) of the nearby vehicle based on the calculated information. Thus, it is possible to estimate me positional relationship between the host vehicle and the nearby vehicle, and the tendencies in the cruising manner of the nearby vehicle (vehicle-to-vehicle distance, vehicle speed, acceleration/deceleration, and driver's preference, for example, inhibitions against changing lanes). The behavior prediction unit 16a obtains the information concerning the shape of the road (whether the number of lanes increases/decreases, whether the road and another road join together, whether the road branches off into multiple roads, whether there is a curve in the road ahead, the road line shape, etc.) on which the host vehicle is running based on information from a navigation system, infrastructure installation, etc. Then, the behavior prediction unit 16*a* predicts the behaviors that may be exhibited by the nearby vehicle, based on the history information concerning the position of the nearby vehicle, the current state of the nearby vehicle, and the information concerning the road shape. The positional relationship between the host vehicle and the nearby vehicle and the tendencies in the cruising manner of the nearby vehicle are taken into account in prediction of the behaviors that may be exhibited by the nearby vehicle. At this time, the behavior prediction unit 16*a* estimates the probabilities that the nearby vehicle will exhibit the behaviors.

For example, as shown in FIG. 2, when a nearby vehicle A is running in the middle lane at current time point T0, it is predicted that the nearby vehicle A will keep running straight in the middle lane, move into the left lane, or move into the right lane. For example, when the positional information history indicates that the nearby vehicle a tends to change lanes infrequently, the behavior prediction unit 16*a* sets the probability that the nearby vehicle A will keep running straight to a high value. When the history information concerning the position of the nearby vehicle A indicates that the nearby vehicle A tends to change lanes frequently, the behavior prediction unit 16*a* sets the probability that the nearby vehicle A will move into the right or left lane to a high value. When it is determined that the vehicle body is inclined toward the left lane based on the information, for example, the yaw-angle of the nearby vehicle A with respect to the road line shape, the behavior prediction unit 16*a* sets the probability that the nearby vehicle A will move into the left lane to a high value.

The behaviors of the nearby vehicle are predicted preferably in the following manner. The behaviors actually exhibited by the nearby vehicle in each situation are associated with the information such as the road line shape and the positional relationship between the host vehicle and the nearby vehicle, accumulated and then learned. Then, the behaviors of the nearby vehicle are predicted with the tendencies in the cruising manner of the nearby vehicle, which are obtained through the learning, taken into account.

The position prediction unit 16*b* predicts the positions of the nearby vehicle A at time point T1, which is a predetermined time (for example, 50 milliseconds) after time point T0, based on the position of the nearby vehicle A at time point T0 and the behaviors of the nearby vehicle A predicted by the behavior prediction unit 16*a*. The current state of the nearby vehicle A such as the vehicle speed and the acceleration is taken into account in prediction of the positions of the nearby vehicle A at time point T1.

After the positions of the nearby vehicle A at time point T1 are predicted, the behavior prediction unit 16*a* predicts the behaviors that may be exhibited by the nearby vehicle A at time point T1. The position prediction unit 16*b* predicts the positions of the nearby vehicle A at time point T2, which is the predetermined time (for example, after 50 milliseconds) after time point T1, based on the positions of the nearby vehicle A at time point T1 and the behaviors of the nearby vehicle A predicted by the behavior prediction unit 16*a*. The estimated vehicle speed, acceleration, etc. of the nearby vehicle A are taken into account in prediction of the positions of the nearby vehicle A at time point T2. In this way, the positions that will be reached by each of all the nearby vehicles at predetermined intervals are predicted. The positions of each of the nearby vehicles at each of the time points, which are at the predetermined intervals, within a predetermined prediction duration (for example, for several tens of seconds) are predicted.

The cruise control plan preparation unit 18 prepares multiple tentative cruise control plans (including paths that will be taken by the host vehicle and speed patterns) that may be implemented during the predetermined prediction duration (for example, several tens of seconds). Requests from the driver (for example, level of propriety given to reduction in travel time, level of priority given to high fuel efficiency, and plan for rest) and the cruise environment condition are taken into account in preparation of the tentative cruise control plans. For example, when the driver gives priority to reduction in travel time, the cruise control plan preparation unit 18 prepares multiple cruise control plans according to which frequent lane changes are permitted to allow the vehicle to reach the destination earlier. When the driver gives priority to high fuel efficiency, the cruise control plan preparation unit 18 prepares multiple cruise control plans according to which a brake is applied less frequently and the vehicle change lanes less frequently to take a smoothly extending path.

The evaluation unit 20 includes a predicted vehicle-presence region drawing-up unit 20*a*, a contact impermissible region/emergency contact-avoidance ensuring region drawing-up unit 20*b*, and a determination unit 20*c*.

The predicted vehicle-presence region drawing-up unit 20*a* obtains the positions of the nearby vehicle at each of the time points within the predetermined prediction duration and the probabilities that the nearby vehicle will be at the respective positions. The positions are predicted and the probabilities are estimated by the position prediction unit 16*b* and the behavior prediction unit 16*a* of the estimation/prediction calculating unit 16. Then, the predicted vehicle-presence region drawing-up unit 20*a* draws up the predicted vehicle-presence region $S_A$ that indicates the region, in which the nearby vehicle is predicted to be present, using a probability distribution, as shown in FIG. 2. In FIG. 2, the probability of the presence of the nearby vehicle is indicated by the level of shades of gray. The darker area indicates higher probability of presence of the nearby vehicle. When there are multiple nearby vehicles A, B and C, all the predicted vehicle-presence regions $S_A$, $S_B$ and $S_C$ are superimposed with each other, as shown in FIG. 3.

The contact impermissible region/emergency contact-avoidance ensuring region drawing-up unit 20*b* obtains multiple cruise control plans from the cruise control plan preparation unit 18. Then, for each cruise control plan, the contact impermissible region/emergency contact-avoidance ensuring region drawing-up unit 20*b* draws up the contact impermissible region N at each of time point T1, time point T2 and the following time points within the predetermined prediction duration from current time point T0, as shown in FIG. 4A. The contact impermissible region N indicates the region, which needs to be maintained to prevent contact between the host vehicle M and a nearby vehicle, using, a probability distribution. The center of the contact impermissible region N corresponds to the position of the host vehicle M at each time point within the predetermined prediction duration. The outline of the contact impermissible region N surrounds the host vehicle M. In addition, for each cruise control plan, the contact impermissible region/emergency contact-avoidance ensuring region drawing-up unit 20*b* draws up the emergency contact-avoidance ensuring region P at each of time point T1, time point T2 and the following time points within the predetermined prediction duration from current time point T0, as shown in FIG. 4B. The contact-avoidance ensuring region P indicates the region, which needs to be maintained to prevent contact between the host vehicle M and a nearby vehicle in the event of an emergency, using a probability distribution. The center of the emergency contact-avoidance ensuring region P corresponds to the position of the host vehicle M at each time point within the predetermined prediction duration. The outline of the emergency contact-avoidance ensuring region P surrounds the host vehicle M.

The outline of the contact impermissible region N substantially corresponds to the outline of the host vehicle M. When the driver tends to be safety-sensitive or give priority to maintenance of a long vehicle-to-vehicle distance, the contact impermissible region is set to be wide, and the probability that the host vehicle M will be in the contact impermissible region N is set to a high value. The emergency contact-avoidance ensuring region P is the region that needs to be maintained to prevent contact between the host vehicle M and the nearby vehicle in the event of an emergency. Basically, the emergency contact-avoidance ensuring region P is drawn up to prevent contact between the host vehicle M and the nearby vehicle that may be caused when a braking force is applied to the host vehicle M. Accordingly, the emergency contact-avoidance ensuring region P is basically drawn so that the area behind the host vehicle M is set to be wide. When the host vehicle M is decelerating, the area behind the host vehicle M is set to be wide and the area in front of the host vehicle M is set to be narrow. When a lateral velocity is generated, for example, when the vehicle is changing lanes, the area present in the moving direction is set to be wide, and the area present in the direction opposite to the moving direction is set to be narrow. When a lateral velocity is generated, for example, when the vehicle is going round a curve, it is difficult to suppress generation of lateral velocity by a larger amount. Accordingly, the area on the side on which the lateral velocity is reduced is set to be wide, and the region on the side on which the lateral acceleration is increased is set to be narrow. When the driver is safety-sensitive, the area behind the vehicle is set to be wider than each of the area in front of the host vehicle M and the area to the side of the host vehicle M. When the driver gives priority to reduction in travel time, not only the area behind the host vehicle M but also the area in front of the host vehicle M and the area to the side of the host vehicle M are set to be narrow.

Figure 5A:
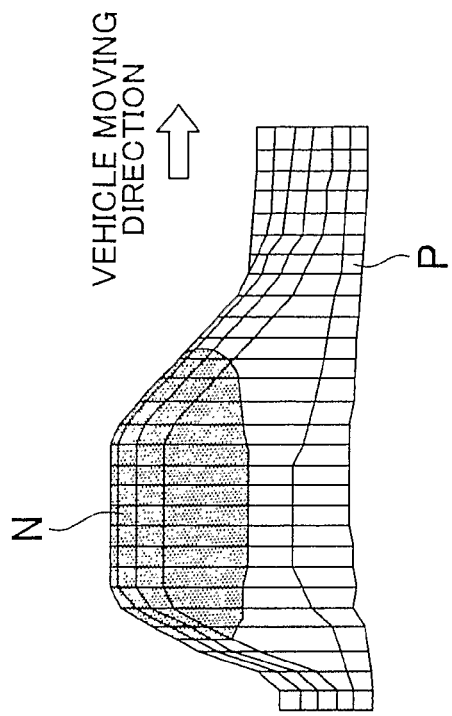
FIGS. 5a to 5d are views illustrating the method for setting the contact impermissible region and the emergency contact-avoidance ensuring region.
Figure 5C:
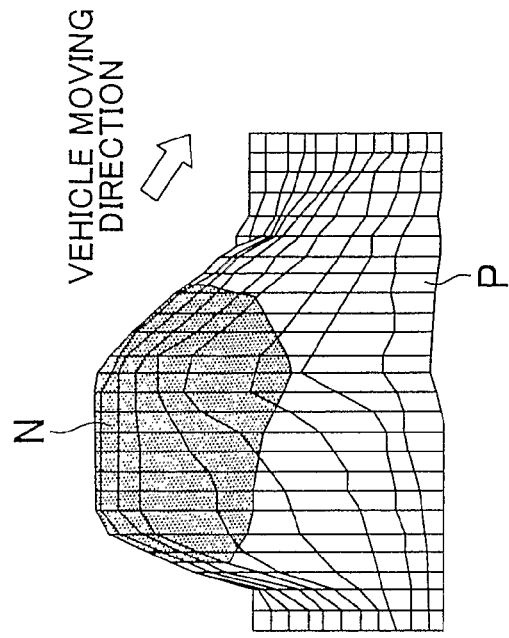
Figure 5B:
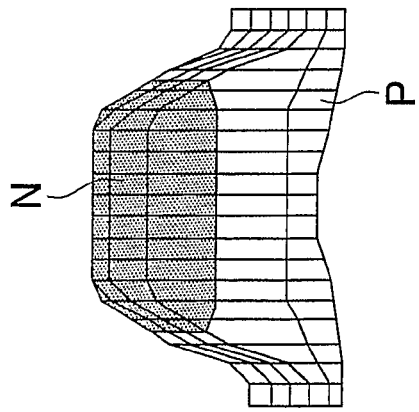
Figure 5D:
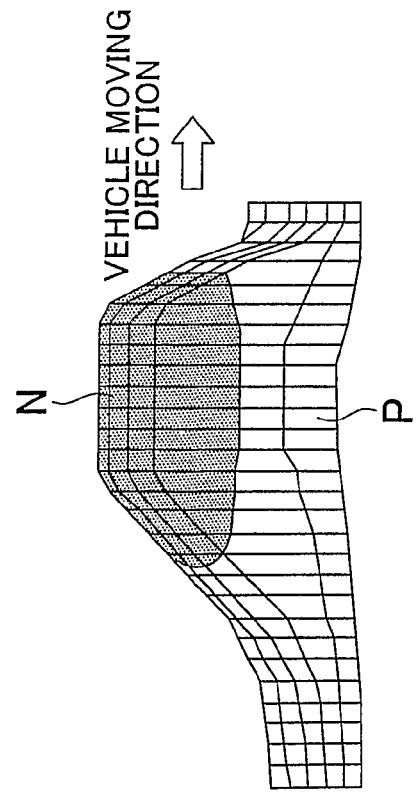

FIG. 5A to 5D indicate examples of the manners for setting the contact impermissible region N and the emergency contact-avoidance ensuring region P. FIG. 5A indicates the contact impermissible region N and the emergency contact-avoidance ensuring region P at normal time. The probability that the host vehicle M will be present in the contact impermissible region N is set to a high value. The probability that the host vehicle M will be present in the emergency contact-avoidance ensuring region P is set to a low value. For example, 100% is used to define the contact impermissible region N, and 50% is used to define the emergency contact-avoidance ensuring region P. These regions are set by smoothly combining the contact impermissible region N and the contact impermissible region P with each other. FIG. 5B indicates the contact impermissible region N and the emergency contact-avoidance ensuring region P when the host vehicle M is decelerating. In this case, the area in the emergency contact-avoidance ensuring region P, which is behind the host vehicle M, is enlarged. FIG. 5C indicates the contact impermissible region N and the emergency contact-avoidance ensuring region P when the host vehicle M is accelerating. The area in the emergency contact-avoidance ensuring region P, which is in front of the host vehicle M, is enlarged. FIG. 5D indicates the contact impermissible region N and the emergency contact-avoidance ensuring region P when the host vehicle M is changing the lanes. The area in the emergency contact-avoidance ensuring region P, which is present in the moving direction of the host vehicle M, is enlarged.

Figure 6A:
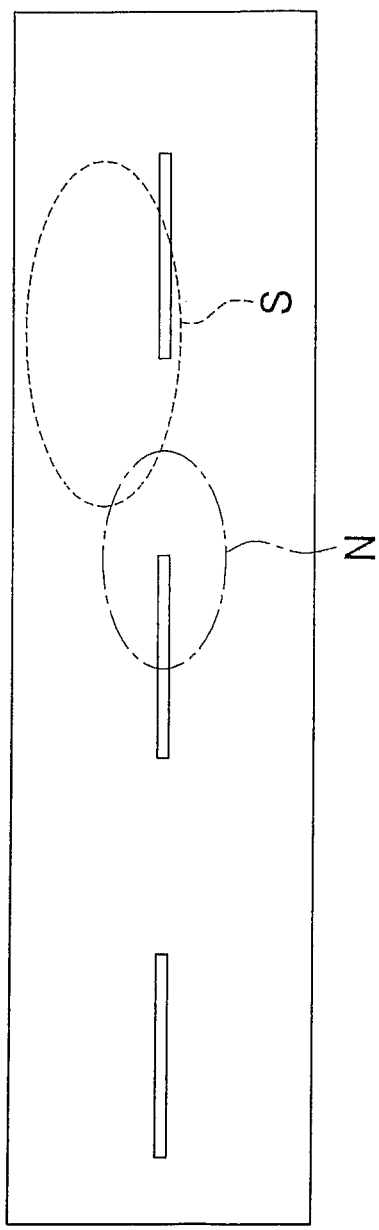
FIG. 6A is a view illustrating the multiply-and-accumulation of the predicted vehicle-presence region and the contact impermissible region.

The determination unit 20c obtains the predicted vehicle-presence region S of the nearby vehicle and the contact impermissible region N of the host vehicle, and determines whether the result of multiply-and-accumulation of the predicted vehicle-presence region S and the contact impermissible region N is equal to or lower than the first threshold value L1 at any time point within the predetermined prediction duration, as shown in FIG. 6A. More specifically, in the case where the x-y coordinate system is set on the road on which the host vehicle M is running, the predicted vehicle-presence region S is indicated by a probability distribution S (x-y), and the contact impermissible region N is indicated by a probability distribution N (x-y), it is determined whether the following equation is satisfied at any time point within the predetermined prediction duration.

$$\sum_x \sum_y S(x, y) * N(x, y) \leq L1.$$

Figure 6B:
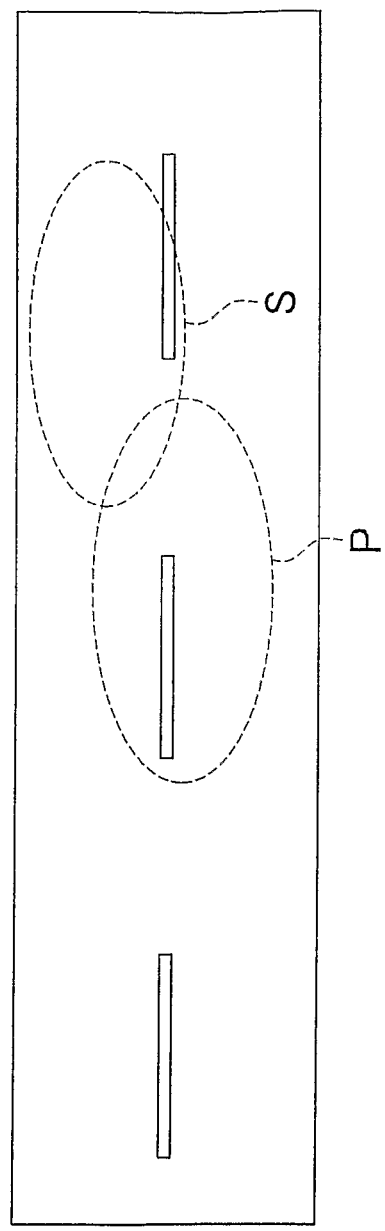
FIG. 6B is a view illustrating the multiply-and-accumulation of the predicted vehicle-presence region and the emergency contact-avoidance ensuring region.

In addition, the determination unit 20c obtains the predicted vehicle-presence region S of the nearby vehicle and the emergency contact-avoidance ensuring region P of the host vehicle, and determines whether the result of multiply-and-accumulation of the predicted vehicle-presence region S and the emergency contact-avoidance ensuring region P is equal to or lower than the second threshold value L2 at any time point within the predetermined prediction duration, as shown in FIG. 6B. More specifically, in the case where the x-y coordinate system is set on the road on which the host vehicle M is running, the predicted vehicle-presence region S is indicated by a probability distribution S (x-y), and the emergency contact-avoidance ensuring region P is indicated by a probability distribution P (x-y), it is determined whether the following equation is satisfied at any time point within the predetermined prediction duration.

$$\sum_x \sum_y S(x, y) * P(x, y) \leq L2$$

When the result of multiply-and-accumulation of the predicted vehicle-presence region S and the contact impermissible region N exceeds the first threshold value L1 at at least one of the time points within the predetermined prediction duration or the result of multiply-and-accumulation of the predicted vehicle-presence region S and the emergency contact-avoidance ensuring region P exceeds the second threshold value L2 at at least one of the time points within the predetermined prediction duration, it is determined that the cruise control plan under evaluation is not safe and therefore the host vehicle is not allowed to run according to this cruise control plan. On the other hand, when the result of multiply-and-accumulation of the predicted vehicle-presence region S and the contact impermissible region N is equal to or lower than the first threshold value L1 at any time point within the predetermined prediction duration and the result of multiply-and-accumulation of the predicted vehicle-presence region S and the emergency contact-avoidance ensuring region P is equal to or lower than the second threshold value L2 at any time point within the predetermined prediction duration, it is determined that the cruise control plan is safe and therefore the host vehicle is allowed to run according to this cruise control plan.

The cruise control plan selection unit 22 selects the cruise control plan that will be implemented from among the multiple cruise control plans based on the results of determinations made by the determination unit 20c of the evaluation unit 20. For example, when there is only one cruise control plan that is determined to be safe, this cruise control plan is selected as the cruise control plan that will be implemented. When there are multiple cruise control plans that are determined to be safe, the cruise control plan having a lower multiply-and-accumulation value and a higher level of safety is selected as the cruise control plan that will be implemented. When there is no cruise control plan that is determined to be safe, the cruise control plan having the highest level of safety may be selected. Alternatively, the cruise control plan preparation unit 18 may relax the condition for determining whether a cruise control plan is safe, prepare tentative cruise control plans, and evaluate the tentative cruise control plans.

The motion control unit 30 prepares a command value given to an actuator 28 based on the selected cruise control plan (path which will be taken by the host vehicle, and speed pattern). The estimate value of the state quantity of the host vehicle is taken into account in preparation of the command value. The command value is prepared in a manner such that the position and speed of the host vehicle M at each time point within the predetermined prediction duration are accurately achieved.

Next, the cruise control over the automatically-operated vehicle, which is executed by the automatic operation control apparatus 1, will be described. In addition, the method for evaluating the cruise control plan using the evaluation device 10 will be described.

First, the nearby vehicle recognition unit 12 recognizes a nearby vehicle near the host vehicle based on the values detected by the perimeter monitoring sensor 24, and calculates the relative distance, angle and speed between the host vehicle and the nearby vehicle. The host vehicle state-quantity estimation unit 14 calculates the estimate value of the current state quantity of the host vehicle (position, yaw-rate, lateral position within the lane, lateral velocity, yaw-angle with respect to the road line shape, etc.).

Figure 7:
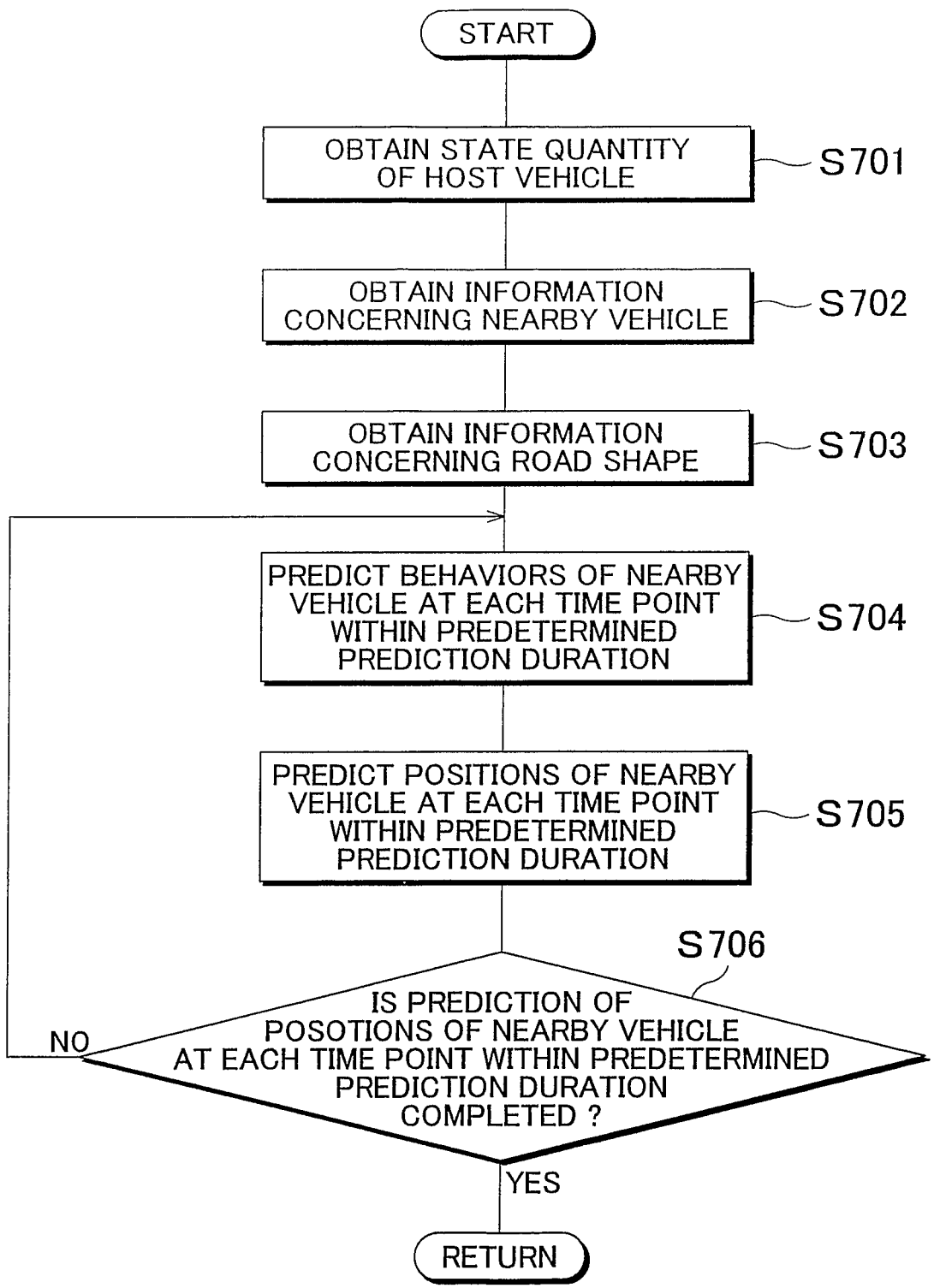
FIG. 7 is a flowchart showing the routine executed by an estimation/prediction calculating unit.

Next, the estimation/prediction calculating unit 16 calculates the positions that will be reached by the nearby vehicle at predetermined intervals and the probabilities that the nearby vehicle will be at the respective positions. The positions of the nearby vehicle at each of the time points, which are at the predetermined intervals, within the predetermined prediction duration (for example, for several tens of seconds) from the current moment are predicted. FIG. 7 is a flowchart showing the routine executed by the estimation/prediction calculating unit 16. As shown in FIG. 7, the behavior prediction unit 16a obtains the estimate value of the state quantity of the host vehicle calculated by the host vehicle stare-quantity estimation unit 14 (step S701). The behavior prediction unit 16a obtains the information concerning the nearby vehicle calculated by me nearby vehicle recognition unit 12 (step S702). In addition, the behavior prediction unit 16a obtains the information concerning the shape of the road (whether the number of lanes increases/decreases, whether the road and another road join together, whether the road branches off into multiple roads, whether there is a curve in the road ahead, the road line shape, etc.) on which the host vehicle is running based on information from the navigation system, the infrastructure installation, etc (step S703). Then, the behavior prediction unit 16a calculates the history information concerning the position of the host vehicle, the history information concerning the relative position between the host vehicle and the nearby vehicle, the relative speed between the host vehicle and the nearby vehicle, etc. based on the obtained information, and estimates the history information concerning the position of the nearby vehicle, and the current state (speed, acceleration, yaw-angle with respect to the road line shape, etc) of the nearby vehicle based on the calculated information. Then, the behavior prediction unit 16a predicts the behaviors that may be exhibited by the nearby vehicle, based on the history information concerning the position of the nearby vehicle, the current state of the nearby vehicle, and the information concerning the road shape. The positional relationship between the host vehicle and the nearby vehicle and the tendencies in the cruising manner of the nearby vehicle are taken into account in prediction of the behaviors that may be exhibited by the nearby vehicle.

The position prediction unit 16b predicts the positions of the nearby vehicle at time point T1, which is the predetermined time (for example, 50 milliseconds) after time point T0, based on the position of the nearby vehicle at time point T0 and the behaviors predicted by the behavior prediction unit 16a. The current state of the nearby vehicle such as the vehicle speed and the acceleration is taken into account in prediction of the positions of the nearby vehicle.

Then, it is determined whether the prediction of the positions of the nearby vehicle and the estimation of the probabilities that the nearby vehicle will be at the respective positions at each of the time points within the predetermined prediction duration (for example, several tens of seconds) are completed (step S706). If a negative determination is made, step S704 is executed again. The behavior prediction unit 16a predicts the behaviors that may be exhibited by the nearby vehicle at time point T1. The position prediction unit 16b predicts the positions of the nearby vehicle at time point T2, which is the predetermined time (for example, 50 milliseconds) after time point T1, based on the positions of the nearby vehicle at time point T1 and the behaviors of the nearby vehicle predicted by the behavior prediction unit 16a. The estimate values of the vehicle speed and acceleration, etc. of the nearby vehicle are taken into account in prediction of the positions of the nearby vehicle. In this way, the positions that will be reached by each of all the nearby vehicles at predetermined intervals are predicted. The positions of each nearby vehicle at each of the time points, which are at the predetermined intervals, within the predetermined prediction duration (for example, for several tens of seconds) are predicted. If an affirmative determination is made in step S706, the routine ends.

Figure 8:
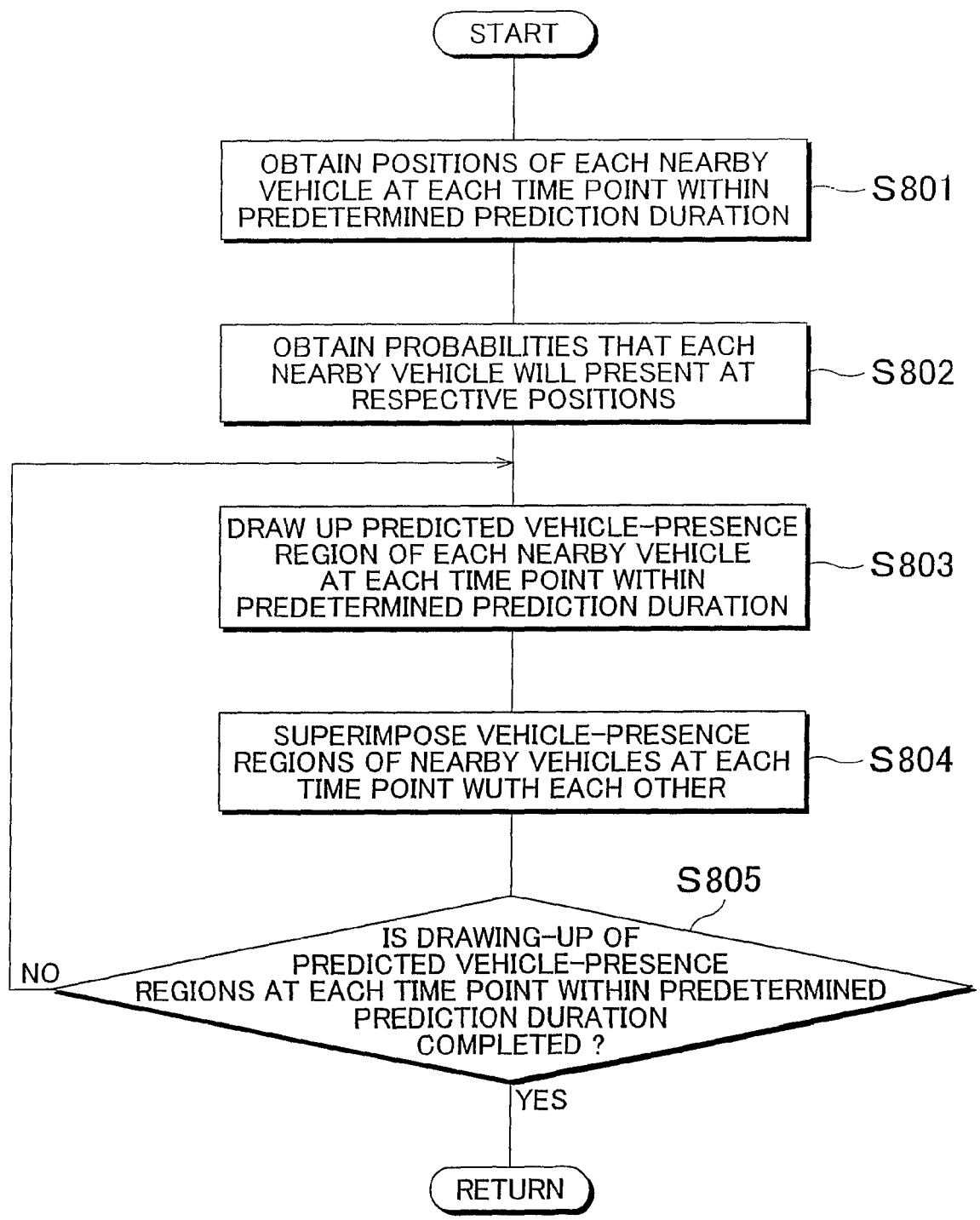
FIG. 8 is a flowchart showing the routine executed by a predicted vehicle-presence region drawing-up unit.

Next, the predicted vehicle-presence region drawing-up unit 20a draws up the predicted vehicle-presence region that indicates the region, in which the nearby vehicle is predicted to be present, using a probability distribution. FIG. 8 is a flowchart showing the routine executed by the predicted vehicle-presence region drawing-up unit 20a. As shown in FIG. 8, the predicted vehicle-presence region drawing-up unit 20a obtains the positions of the nearby vehicle at each of the time points within the predetermined prediction duration and the probabilities that the nearby vehicle will be at the respective positions. The positions are predicted and the probabilities are estimated by the position prediction unit 16b and the behavior prediction unit 16a of the estimation/prediction calculating unit 16 (steps S801 and S802). Then, the predicted vehicle-presence region drawing-up unit 20a draws up the predicted vehicle-presence region of each nearby vehicle at each time point within the predetermined prediction duration, as shown in FIG. 2 (step S803). When there are multiple nearby vehicles, all the predicted vehicle-presence regions at each time point within the predetermined prediction duration are superimposed with each other (step S804). Then, it is determined whether drawing-up of the predicted vehicle-presence regions at each of the time points within the predetermined prediction duration (for example, several tens of seconds) is completed (step S805). If a negative determination is made, step S803 is executed again. On the other hand, if an affirmative determination is made, the routine ends.

Figures 9A, 9B, 9C:
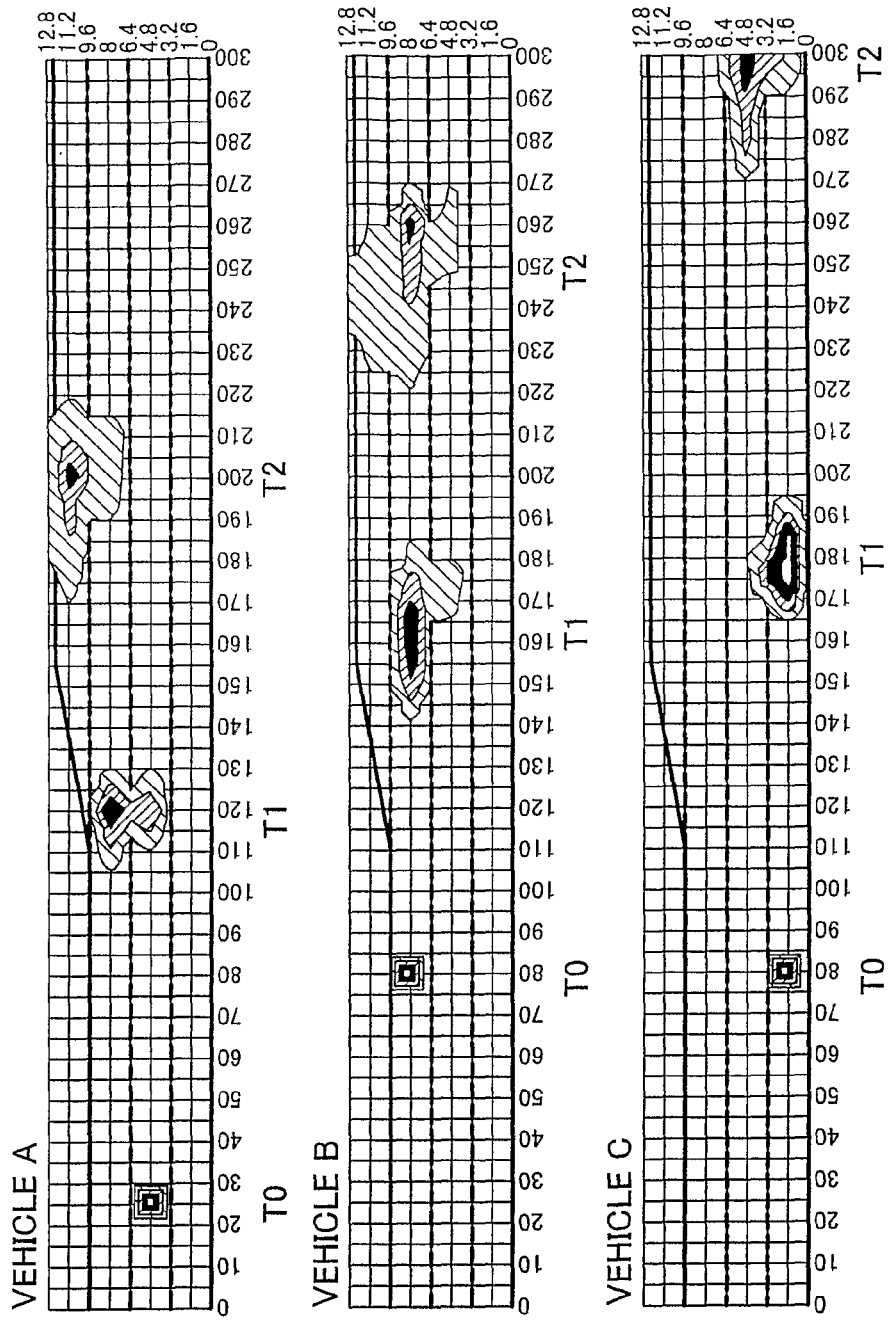
FIGS. 9A, 9B and 9C are views showing the predicted vehicle-presence regions of the nearby vehicles A, B, and C, respectively.
Figure 10A:
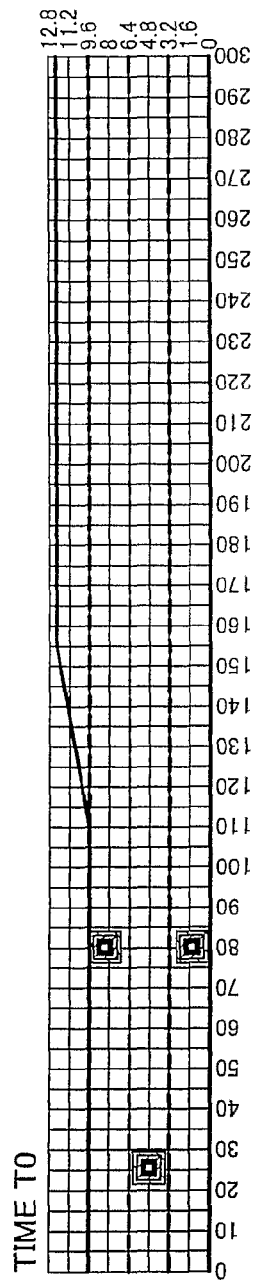
FIGS. 10A to 10C are views showing the predicted vehicle-presence regions of the nearby vehicles A, B and C, which are superimposed with each other, at different time points.
Figure 10B:
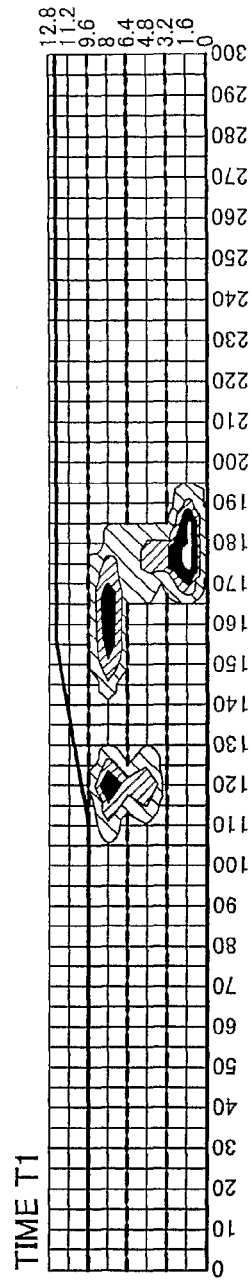
Figure 10C:
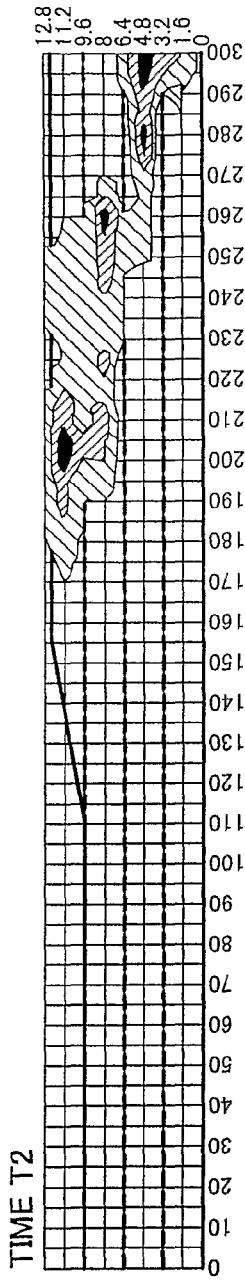

FIGS. 9A, 9B and 9C show the predicted vehicle-presence regions of the vehicles A, B and C, respectively. FIGS. 10A, 10B, and 10C show the predicted vehicle-presence regions of the vehicles A, B and C, which are superimposed with each other, at time point T0, time point T1, and time point T2, respectively. As shown in FIGS. 9A to 9C and FIGS. 10A to 10C, a black area, a downward-sloping hatched area, an upward-sloping hatched area, and an open area indicate different probabilities. The probabilities of presence of the nearby vehicles A, B and C are indicated using probability distributions, as shown in FIGS. 9A to 9C and FIGS. 10A to 10C.

The cruise control plan preparation unit 18 prepares multiple tentative cruise control plans (including paths that will be taken by the host vehicle and speed patterns) that will be implemented during the predetermined prediction duration (for example, several tens of seconds). Requests from the driver (for example, level of propriety given to reduction in travel time, level of priority given to high fuel efficiency, and plan for rest) and the cruise environment condition are taken into account in preparation of the tentative cruise control plans.

Figure 11:
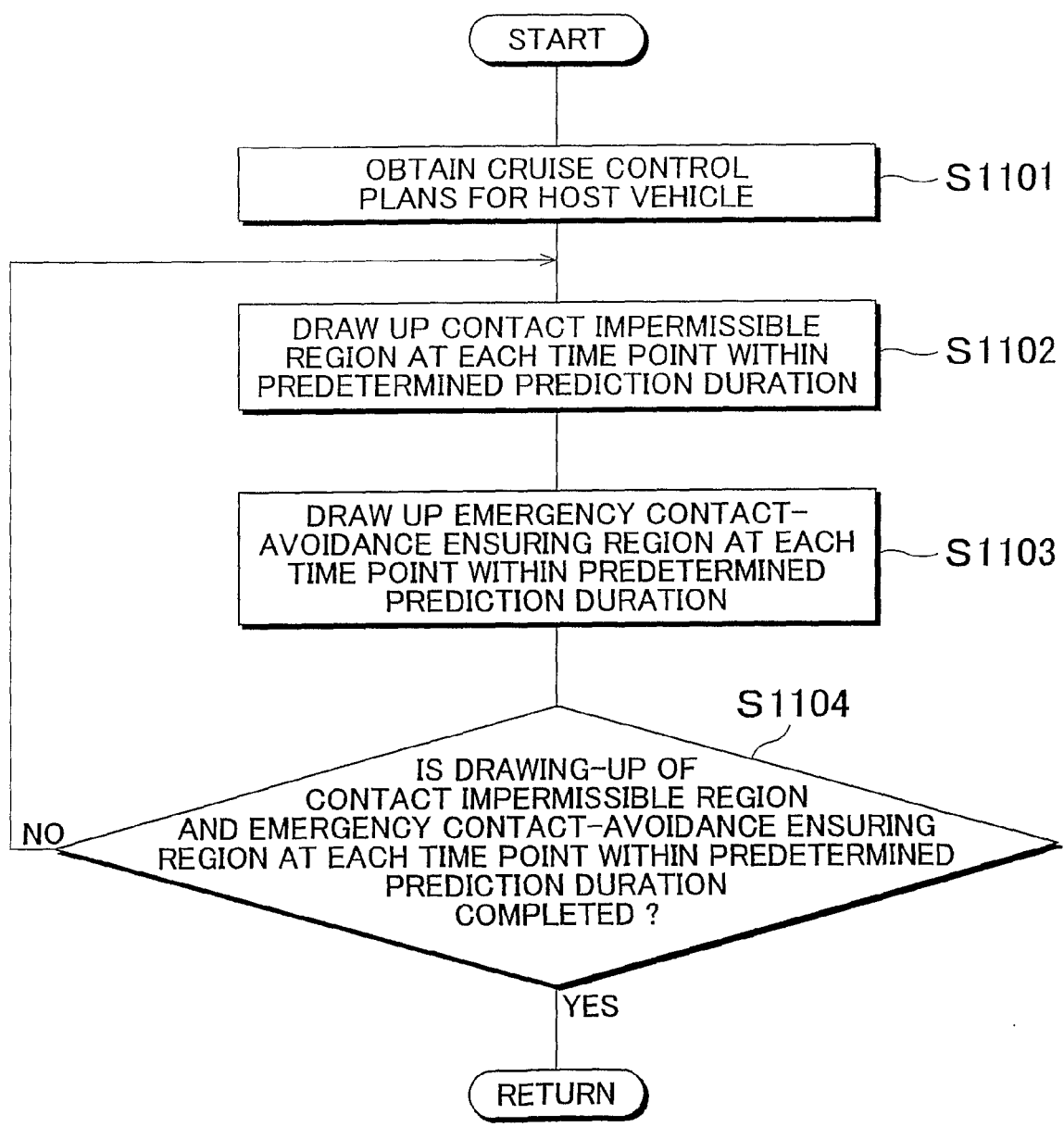
FIG. 11 is a flowchart showing the routine executed by a contact impermissible region/emergency contact-avoidance ensuring region drawing-up unit.

The contact impermissible region/emergency contact-avoidance ensuring region drawing-up unit 20b draws up the contact impermissible region and the emergency contact-avoidance ensuring region in a manner such that each of the outlines of these regions surrounds the host vehicle. FIG. 11 is a flowchart showing the routine executed by the contact impermissible region/emergency contact-avoidance ensuring region drawing-up unit 20b. The contact impermissible region/emergency contact-avoidance ensuring region drawing-up unit 20b obtains multiple cruise control plans for the host vehicle from the cruise control plan preparation unit 18, as shown in FIG. 11 (step S1101), Then, for each cruise control plan, the contact impermissible region/emergency contact-avoidance ensuring region drawing-up unit 20b draws up the contact impermissible region at each of time point T1, time point T2 and the following time points within the predetermined prediction duration from current time point T0. The contact impermissible region indicates the region, which needs to be maintained to prevent contact between the host vehicle and the nearby vehicle, using a probability distribution. The center of the contact impermissible region corresponds to the position of the host vehicle at each time point within the predetermined prediction duration. The outline of the contact impermissible region surrounds the host vehicle (step S1102). In addition, for each cruise control plan, the contact impermissible region/emergency contact-avoidance ensuring region drawing-up unit 20b draws up the emergency contact-avoidance ensuring region at each of time point T1, time point T2 and the following time points within the predetermined prediction duration from current time point T0. The contact-avoidance ensuring region indicates the region, which needs to be maintained to prevent contact between the host vehicle and the nearby vehicle in the event of an emergency, using a probability distribution. The center of the emergency contact-avoidance ensuring region corresponds to the position of the host vehicle. The outline of the emergency contact-avoidance ensuring region surrounds the host vehicle, (stop S1103). Then, it is determined whether drawing-up of the contact impermissible region and the emergency contact-avoidance ensuring region at each of the time points within the predetermined prediction duration (for example, several tens of seconds) is completed (step S1104). If a negative determination is made, step S1102 is executed again. On the other hand, an affirmative determination is made, the routine ends.

Next, the determination unit 20c determines whether the obtained cruise control plans are safe. FIG. 12 is a flowchart showing the routine executed by the determination unit 20c. First, the determination unit 20c obtains the contact impermissible region and the emergency contact-avoidance ensuring region at each time point within the predetermined prediction duration in each of the multiple cruise control plans (step S1201). Next, the determination unit 20c obtains the predicted vehicle-presence region of the nearby vehicle at each time point within the predetermined prediction duration (step S1202). Then, the determination unit 20c selects one cruise control plan that will be evaluated (step S1203). Next, the determination unit 20c derives the result of multiply-and-accumulation of the predicted vehicle-presence region of the nearby vehicle and the contact impermissible region of the host vehicle in the selected cruise control plan at each time point within the predetermined prediction duration (step S1204). Then, the determination unit 20c determines whether the result of multiply-and-accumulation is equal to or lower than the first threshold value at any time point within the predetermined prediction duration (step S1205). For example, if the result of multiply-and-accumulation exceeds 1%, which is used as the first threshold value, at at least one of the time points within the predetermined prediction duration, it is determined that the cruise control plan is not safe and therefore the host vehicle is not allowed to run according to the selected cruise control plan (step S1206). On the other hand, if the result of multiply-and-accumulation is equal to or lower than the first threshold value at any time point within the predetermined prediction duration, step S1207 is executed.

In step S1207, the determination unit 20c derives the result of multiply-and-accumulation of the predicted vehicle-presence region of the nearby vehicle and the emergency contact-avoidance ensuring region of the host vehicle in the selected cruise control plan at each time point within the predetermined prediction duration. Then, the determination unit 20c determines whether the result of multiply-and-accumulation is equal to or lower than the second threshold value at any time point within the predetermined prediction duration (step S1208). For example, if the result of multiply-and-accumulation exceeds 10%, which is used as the second threshold value, at at least one of the time points within the predetermined prediction duration, it is determined that the cruise control plan is not safe and therefore the host vehicle is not allowed to run according to the selected cruise control plan (step S1206). On the other hand, if the result of multiply-and-accumulation is equal to or lower than the second threshold value at any rime point within the predetermined prediction duration, the determination unit 20c determines in step S1209 that the cruise control plan is safe and therefore the host vehicle is allowed to run according to the selected cruise control plan. Then, the determination unit 20c determines whether the evaluations on all the cruise control plans are completed (step S1210). If a negative determination is made, step S1203 is executed again. On the other hand, if an affirmative determination is made, the routine ends.

Next, the cruise control plan selection unit 22 selects the cruise control plan that will be executed from among the multiple cruise control plans based on the results of determinations made by the determination unit 20c of the evaluation unit 20. For example, when there is only one cruise control plan that is determined to be safe, this cruise control plan is selected as the cruise control plan that will be implemented. When there are multiple cruise control plans that are determined to be safe, the cruise control plan having a lower multiply-and-accumulation value and a higher level of safety is selected as the cruise control plan that will be implemented. When there is no cruise control plan that is determined to be safe, the cruise control plan having the highest level of safety may be selected. Alternatively, the cruise control plan preparation unit 18 may relax the condition for determining whether a cruise control plan is safe, prepare tentative cruise control plans, and evaluate the tentative cruise control plans.

The motion control unit 30 prepares a command value given to an actuator 28 based on the selected cruise control plan (path which will be taken by the vehicle, and speed pattern). The estimate value of the state quantity of the host vehicle is taken into account in preparation of the command value. The command value is prepared in a manner such that the position and speed of the host vehicle at each time point within the predetermined prediction duration are accurately achieved.

FIGS. 13A, 13B and 13C are views showing an example of the cruise control plan that is determined to be safe according to the above-described evaluation method. If the automatic operation control over the host vehicle M is executed according to the cruise control plan shown in FIGS. 13A, 13B and 13C, the host vehicle M does not contact the nearby vehicle at normal time. Even in the event of an emergency, the provability that the host vehicle M will contact the nearby vehicle is considerably low, and the automatic operation control over the host vehicle M is executed considerably safely.

Next, the effects produced by the automatic operation control apparatus 1 including the above-described evaluation device 10 will be described.

According to the embodiment of the invention, the behavior prediction unit 16a constantly predicts the behaviors that may be exhibited by the nearby vehicles, the position prediction unit 16b predicts the positions of the nearby vehicles, and the evaluation unit 20 evaluates the safety of the cruise control plans. Accordingly, the behaviors of the manually-operated vehicles that change constantly are accurately predicted. As a result, the safety of the cruise control plans for the automatically-operated vehicle is accurately evaluated.

The behavior prediction unit 16a predicts the behaviors of the nearby vehicles based on at least the information concerning the shape of the road. Accordingly, it is possible to accurately predict the behaviors that may be exhibited by the nearby vehicles based on, for example, the information, for example, whether the number of lanes decreases and whether there is a curve in the road ahead.

The cruise control plan preparation unit 18 prepares multiple cruise control plans for the automatically-operated vehicle, and the cruise control plan selection unit 22 selects the cruise control plan that will be implemented from among the multiple cruise control plans based on the results of evaluations made by the evaluation unit 20. Accordingly, it is possible to select the cruise control plan having a higher level of safety as the cruise control plan that will be implemented.

The behavior prediction unit 16a predicts the behaviors that may be exhibited by the nearby vehicles and estimates the probabilities that the nearby vehicles will exhibit the behaviors. Accordingly, it is possible to predict the positions of the nearby vehicles and the probabilities that the nearby vehicles will be at the respective positions. The results of estimation and prediction are used to accurately evaluate the safety of the cruise control plans.

When the result of multiply-and-accumulation of the predicted vehicle-presence region, which indicates the region in which the nearby vehicle is predicted to be present using a probability distribution, and the contact impermissible region, which indicates the region that needs to be maintained to prevent contact between the host vehicle and the nearby vehicle using a probability distribution, is equal to or lower than the first threshold value at any time point within the predetermined prediction duration, the determination unit 20c of the evaluation unit 20 determines that this cruise control plan is safe. In this way, it is possible to more accurately evaluate the safety of the cruise control plan for the automatically-operated vehicle.

In addition, when the result of multiply-and-accumulation of the predicted vehicle-presence region of the nearby vehicle and the emergency contact-avoidance ensuring region, which needs to be maintained to prevent contact between the host vehicle and the nearby vehicle in the event of an emergency, is equal to or lower than the second threshold value at any time point within the predetermined prediction duration, the determination unit 20c of the evaluation unit 20 determines that this cruise control plan is safe. The safety of the cruise control plan is evaluated more accurately, because the measures to prevent contact between the host vehicle and the nearby vehicle in the event of an emergency is also taken into account.

Note that, the invention is not limited to the embodiment described above. The invention is implemented in various modified embodiments. For example, according to the embodiment of the invention described above, the cruise control plan preparation unit 18 prepares multiple tentative cruise control plans, the determination unit 20c evaluates the safety of each cruise control plan, and the cruise control plan selection unit 22 selects one cruise control plan that will be implemented. Alternatively, as shown in FIG. 14, only one cruise control plan may prepared by the cruise control plan preparation unit 18, and this cruise control plan is modified, in a feedback manner indicated by the reference character F, to a safer one based on the evaluation of the safety made by the determination unit 20c. In this say, a safer cruise control plan is prepared.

According to the embodiment of the invention described above, it is determined that the cruise control plan is safe, when the result of multiply-and-accumulation of the predicted vehicle-presence region of the nearby vehicle and the contact impermissible region of the host vehicle is equal to or lower than the first threshold value at any time point within the predetermined prediction duration and the result of multiply-and-accumulation of the emergency contact-avoidance ensuring region of the host vehicle and the predicted vehicle-presence region of the nearby vehicle is equal to or lower than the second threshold value at any time point within the predetermined prediction duration. Alternatively, only the contact impermissible region may be taken into account without taking the emergency contact-avoidance ensuring region into account. More specifically, it may be determined that the cruise control plan is safe and therefore the host vehicle is allowed to run according to the cruise control plan, when the result of multiply-and-accumulation of the contact impermissible region of the host vehicle and the predicted vehicle-presence region of the nearby vehicle is equal to or lower than the first threshold value at any time point within the predetermined prediction duration.

According to the embodiment of the invention described above, the behaviors of each of all the nearby vehicles are predicted, and the positions of each of all the nearby vehicles are predicted. Alternatively, the safety of the cruise control plan may be evaluated in the following manner when part of the nearby vehicles is an automatically-operated vehicle. First, the cruise control plan for the automatically-operated nearby vehicle is obtained via communication, the predicted vehicle-presence region of this nearby vehicle is drawn up, this predicted vehicle-presence region is superimposed with the other predicted vehicle-presence regions. When the nearby vehicle is an automatically-operated vehicle, the behaviors are predicted accurately. Accordingly, the predicted vehicle-presence region of the nearby vehicle is set to be narrower.

According to the embodiment of the invention described above, the cruise control plan evaluation device 10 is mounted in an automatically-operated vehicle. Alternatively, the cruise control plan evaluation device 10 may be provided to the infrastructure installation. In this way, the cruise control plans are evaluated by the infrastructure installation side and the cruise control plan selected by the infrastructure installation side is transmitted to the automatically-operated vehicle, for example, via communication, and automatically-operated control is executed according to the selected cruise control plan.

The invention claimed is:

1. A cruise control plan evaluation device that evaluates safety of a cruise control plan for an automatically-operated vehicle, comprising:
   a behavior prediction unit that is configured to predict a behavior that is exhibited by a nearby vehicle, which is present near the automatically-operated vehicle, at a given time point;
   a position prediction unit that is configured to predict a position of the nearby vehicle after the given time point based on a position of the nearby vehicle at the given time point and the behavior predicted by the behavior prediction unit;
   a cruise control plan preparation unit that is configured to prepare multiple cruise control plans for the automatically-operated vehicle; and
   an evaluation unit that is configured to evaluate the safety of each cruise control plan based on the position of the nearby vehicle predicted by the position prediction unit and a position that is reached by the automatically-operated vehicle according to the cruise control plan, wherein
   the behavior prediction unit is configured to predict the behavior that is exhibited by the nearby vehicle and also configured to estimate a probability that the nearby vehicle exhibits the behavior, and
   the evaluation unit includes:
      a predicted vehicle-presence region drawing-up unit that is configured to draw up a predicted vehicle-presence region that indicates a region, in which the nearby vehicle is predicted to be present, using a probability distribution based on the position of the nearby vehicle predicted by the position prediction unit and the probability estimated by the behavior prediction unit;
      a contact impermissible region drawing-up unit that is configured to draw up a contact impermissible region that indicates a region, which needs to be maintained to prevent contact between the automatically-operated vehicle and the nearby vehicle, using a probability distribution in a manner such that an outline of the contact impermissible region surrounds the automatically-operated vehicle;
      an emergency contact-avoidance ensuring region drawing-up unit that is configured to draw up an emergency contact-avoidance ensuring region that indicates a region, which needs to be maintained to prevent contact between the automatically-operated vehicle and the nearby vehicle in an emergency and is a region that is ensured for the automatically-operated vehicle in the event of the emergency, using a probability distribution in a manner such that an outline of the emergency contact-avoidance ensuring region surrounds the automatically-operated vehicle; and
      a determination unit that is configured to determine that the cruise control plan is safe when a result of multiply-and-accumulation of the predicted vehicle-presence region and the contact impermissible region is equal to or lower than a first threshold value at any time point and when a result of multiply-and-accumulation of the predicted vehicle-presence region and the emergency contact-avoidance ensuring region is equal to or lower than a second threshold value at any time point.

2. The cruise control plan evaluation device according to claim 1, wherein
   the behavior prediction unit is configured to predict the behavior of the nearby vehicle based on at least information concerning a road shape.

3. The cruise control plan evaluation device according to claim 1, further comprising:
   a cruise control plan selection unit that is configured to select the cruise control plan to be implemented from among the multiple cruise control plans based on results of evaluations made by the evaluation unit.

4. The cruise control plan evaluation device according to claim 3, wherein the cruise control plan selection unit is configured to select the cruise control plan to be implemented from among the multiple cruise control plans based on the results of evaluations made by the evaluation unit such that:
   when there is only one cruise control plan that is determined to be safe, this cruise control plan is selected as the cruise control plan that will be implemented,
   when there are multiple cruise control plans that are determined to be safe, the cruise control plan having a lower multiply-and-accumulation value and a higher level of safety is selected as the cruise control plan that will be implemented, and
   when there is no cruise control plan that is determined to be safe, the cruise control plan having a highest level of safety is selected.

5. The cruise control plan evaluation device according to claim 1, wherein requests from a driver of the automatically-operated vehicle are taken into account in preparation of the multiple cruise control plans.

6. The cruise control plan evaluation device according to claim 1, wherein the emergency contact-avoidance ensuring region is drawn so that the area behind the automatically-operated vehicle is set to be wide.

7. The cruise control plan evaluation device according to claim 1, wherein when the automatically-operated vehicle is decelerating, the area behind the automatically-operated vehicle is set to be wide and the area in front of the automatically-operated vehicle is set to be narrow.

8. The cruise control plan evaluation device according to claim 1, wherein when a lateral velocity is generated, the area in the moving direction of the automatically-operated vehicle is set to be wide and the area in the direction opposite to the moving direction is set to be narrow.

9. A cruise control plan evaluation method for evaluating safety of a cruise control plan for an automatically-operated vehicle, comprising:

predicting a behavior that is exhibited by a nearby vehicle, which is present near the automatically-operated vehicle, at a given time point;

predicting a position of the nearby vehicle after the given time point based on a position of the nearby vehicle at the given time point and the predicted behavior;

preparing multiple cruise control plans for the automatically-operated vehicle; and evaluating the safety of each cruise control plan based on the predicted position of the nearby vehicle and a position that is reached by the automatically-operated vehicle according to the cruise control plan, wherein the behavior that is exhibited by the nearby vehicle is predicted and a probability that the nearby vehicle exhibits the behavior is also estimated, and a step of evaluating the cruise control plan includes:

drawing up a predicted vehicle-presence region that indicates a region, in which the nearby vehicle is predicted to be present, using a probability distribution based on the predicted position of the nearby vehicle and the estimated probability;

drawing up a contact impermissible region that indicates a region, which needs to be maintained to prevent contact between the automatically-operated vehicle and the nearby vehicle, using a probability distribution in a manner such that an outline of the contact impermissible region surrounds the automatically-operated vehicle;

drawing up an emergency contact-avoidance ensuring region that indicates a region, which needs to be maintained to prevent contact between the automatically-operated vehicle and the nearby vehicle in an emergency and is a region that is ensured for the automatically-operated vehicle in the event of the emergency, using a probability distribution in a manner such that an outline of the emergency contact-avoidance ensuring region surrounds the automatically-operated vehicle; and determining that the cruise control plan is safe when a result of multiply-and-accumulation of the predicted vehicle-presence region and the contact impermissible region is equal to or lower than a first threshold value at any time point and when a result of multiply-and-accumulation of the predicted vehicle-presence region and the emergency contact-avoidance ensuring region is equal to or lower than a second threshold value at any time point.

10. The cruise control plan evaluation method according to claim 9, wherein
the behavior of the nearby vehicle is predicted based on at least information concerning a road shape.

11. The cruise control plan evaluation method according to claim 9, further comprising:
selecting the cruise control plan to be implemented from among the multiple cruise control plans based on results of evaluations.

12. The cruise control plan evaluation method according to claim 11, wherein the cruise control plan to be implemented is selected from among the multiple cruise control plans based on the results of evaluations such that:
when there is only one cruise control plan that is determined to be safe, this cruise control plan is selected as the cruise control plan that will be implemented,
when there are multiple cruise control plans that are determined to be safe, the cruise control plan having a lower multiply-and-accumulation value and a higher level of safety is selected as the cruise control plan that will be implemented, and
when there is no cruise control plan that is determined to be safe, the cruise control plan having a highest level of safety is selected.

13. The cruise control plan evaluation method according to claim 9, wherein requests from a driver of the automatically-operated vehicle are taken into account in preparation of the multiple cruise control plans.

14. The cruise control plan evaluation method according to claim 9, wherein the emergency contact-avoidance ensuring region is drawn so that the area behind the automatically-operated vehicle is set to be wide.

15. The cruise control plan evaluation method according to claim 9, wherein when the automatically-operated vehicle is decelerating, the area behind the automatically-operated vehicle is set to be wide and the area in front of the automatically-operated vehicle is set to be narrow.

16. The cruise control plan evaluation method according to claim 9, wherein when a lateral velocity is generated, the area in the moving direction of the automatically-operated vehicle is set to be wide and the area in the direction opposite to the moving direction is set to be narrow.

* * * * *